US012560782B2

(12) United States Patent
Lee

(10) Patent No.: US 12,560,782 B2
(45) Date of Patent: Feb. 24, 2026

(54) IMAGING LENS SYSTEM

(71) Applicant: Samsung Electro-Mechanics Co., Ltd., Suwon-si (KR)

(72) Inventor: Da Ye Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 814 days.

(21) Appl. No.: 17/713,405

(22) Filed: Apr. 5, 2022

(65) Prior Publication Data

US 2023/0161138 A1     May 25, 2023

(30) Foreign Application Priority Data

Nov. 25, 2021     (KR) ........................ 10-2021-0164504

(51) Int. Cl.
G02B 13/00          (2006.01)
G02B 9/64           (2006.01)
(52) U.S. Cl.
CPC ........... G02B 13/0045 (2013.01); G02B 9/64 (2013.01)
(58) Field of Classification Search
CPC ...... G02B 13/0045; G02B 9/64; G02B 13/00; G02B 13/18; G02B 3/0087; G02B 2003/0093; G02B 13/06
See application file for complete search history.

(56) References Cited

U.S. PATENT DOCUMENTS

2016/0223790 A1* 8/2016 Liao .................. H01L 21/31116
2018/0059362 A1   3/2018 Yeh 2018/0348491 A1   12/2018 Lee
2019/0204555 A1    7/2019 Jhang et al.
2020/0064595 A1    2/2020 Huang
2020/0209561 A1*   7/2020 Ji ........................ G02B 27/005
2020/0257079 A1    8/2020 Wei et al.
2020/0310083 A1   10/2020 Kim
(Continued)

FOREIGN PATENT DOCUMENTS

CN        107783252 A      3/2018
CN        109541780 A      3/2019
CN        209356747 U      9/2019
(Continued)

OTHER PUBLICATIONS

Mansurov, "What is Field Curvature?", Photographylife.com, Dec. 2019, p. 1 (Year: 2019).*

(Continued)

*Primary Examiner* — Bumsuk Won
*Assistant Examiner* — Ray Alexander Dean
(74) *Attorney, Agent, or Firm* — NSIP Law

(57)          ABSTRACT

An imaging lens system includes a first lens, a second lens, a third lens, a fourth lens, a fifth lens, a sixth lens, and a seventh lens sequentially disposed in ascending numerical order along an optical axis of the imaging system from an object side of the imaging lens system toward an imaging plane of the imaging lens system, wherein the imaging lens system satisfies the conditional expressions 0.13<ImgH/TTL<0.16 and 5.3<TTL/f<5.5, where ImgH is a maximum effective image height on the imaging plane, TTL is a distance along the optical axis from an object side of the first lens to the imaging plane, and f is a focal length of the imaging lens system.

9 Claims, 10 Drawing Sheets

(56)        References Cited

U.S. PATENT DOCUMENTS

| | | | |
|---|---|---|---|
| 2020/0371316 A1 | 11/2020 | Wang et al. | |
| 2021/0255425 A1 | 8/2021 | Jiang et al. | |

FOREIGN PATENT DOCUMENTS

| | | | |
|---|---|---|---|
| CN | 111158109 A | 5/2020 | |
| CN | 111566536 A | 8/2020 | |
| CN | 113093367 A | 7/2021 | |
| CN | 113495342 A | * 10/2021 | ........... G02B 13/006 |
| CN | 113687497 A | 11/2021 | |
| JP | 2016-194653 A | 11/2016 | |
| JP | 2018-159898 A | 10/2018 | |
| KR | 2000-0032796 A | 6/2000 | |
| TW | 201903458 A | 1/2019 | |
| TW | 202009545 A | 3/2020 | |
| TW | M597875 U | 7/2020 | |
| TW | 202141109 A | 11/2021 | |

| | | | |
|---|---|---|---|
| WO | WO 2017/213110 A1 | 12/2017 | |

OTHER PUBLICATIONS

Ma, "CN 113495342", Espacenet.com, Machine Translation, Retrieved Mar. 4, 2025 (Year: 2021).*

Taiwanese Office Action issued on Oct. 11, 2022, in counterpart Taiwanese Patent Application No. 111113747 (5 Pages in English, 4 Pages in Chinese).

Taiwanese Office Action issued on Mar. 8, 2024, in counterpart Taiwanese Patent Application No. 113101813 (6 pages in English, 7 pages in Chinese).

Taiwanese Office Action issued on Apr. 17, 2023, in counterpart Taiwanese Patent Application No. 111113747 (5 pages in English, 4 pages in Chinese).

Chinese Office Action issued on Mar. 21, 2024, in counterpart Chinese Patent Application No. 202210629675.7 (7 pages in English, 15 pages in Chinese).

* cited by examiner

ASTIGMATIC
FIELD CURVES

DISTORTION

IMG HT

IMG HT

FOCUS (MILLIMETERS)

% DISTORTION

IMAGING LENS SYSTEM

CROSS-REFERENCE TO RELATED APPLICATIONS

This application claims the benefit under 35 USC 119(a) of Korean Patent Application No. 10-2021-0164504 filed on Nov. 25, 2021, in the Korean Intellectual Property Office, the entire disclosure of which is incorporated herein by reference for all purposes.

BACKGROUND

1. Field

This application relates to an imaging lens system mountable on a rear camera of a vehicle and a camera for autonomous driving of a vehicle.

2. Description of Related Art

Vehicles produced recently may include a camera intended to reduce damages to persons and property caused by traffic accidents. For example, one or more cameras may be installed on front and rear bumpers of a vehicle to provide a driver with information on objects located on the front and rear sides of the vehicle. A vehicle camera may require a high-resolution performance as it is important for a vehicle camera to recognize objects around a vehicle and to provide the recognized information to a driver. However, it may be difficult for a vehicle camera to implement a high resolution due to a limitation in an installation space. For example, to implement a vehicle camera having a small f-number, i.e., a large aperture, it may be necessary to increase diameters of a front lens and other lenses, but due to structural and design limitations of vehicle components (e.g., a bumper) in which a camera is installed, it may be difficult to arbitrarily change sizes of the lenses.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system, wherein the imaging lens system satisfies the conditional expressions $0.13<\text{ImgH/TTL}<0.16$ and $5.3<\text{TTL/f}<5.5$, where ImgH is a maximum effective image height on the imaging plane, TTL is a distance along the optical axis from an object side of the first lens to the imaging plane, and f is a focal length of the imaging lens system.

The second lens may have a concave object-side surface in a paraxial region thereof.

The fourth lens may have a convex image-side surface in a paraxial region thereof.

The sixth lens may have a concave object-side surface in a paraxial region thereof.

The seventh lens may have a convex image-side surface in a paraxial region thereof.

The second lens may have a negative refractive power.

The fourth lens may have a positive refractive power.

The sixth lens may have a negative refractive power.

The imaging lens system may the conditional expression $0.49\leq|\text{f/f3}|<0.6$, where f3 is a focal length of the third lens.

In another general aspect, an imaging lens system includes a first lens having a negative refractive power; a second lens having a negative refractive power; a third lens having a refractive power; a fourth lens having a refractive power; a fifth lens having a refractive power; a sixth lens having a refractive power; and a seventh lens having a refractive power, wherein the first to seventh lenses are sequentially disposed in ascending numerical order along an optical axis of the imaging lens system from an object side of the imaging lens system toward an imaging plane of the imaging lens system, and the imaging lens system satisfies the conditional expression $5.3<\text{TTL/f}<5.5$, where TTL is a distance along the optical axis from an object side of the first lens to the imaging plane, and f is a focal length of the imaging lens system.

The seventh lens may have a convex image-side surface in a paraxial region thereof.

The seventh lens may have an image-side surface having an inflection point.

The imaging lens system may satisfy the conditional expression $0.03<\text{D34/D12}<0.20$, where D12 is a distance along the optical axis from an image-side surface of the first lens to an object-side surface of the second lens, and D34 is a distance along the optical axis from an image-side surface of the third lens to an object-side surface of the fourth lens.

The imaging lens system may satisfy the conditional expression $0.60<\text{D34/D45}<3.0$, where D34 is a distance along the optical axis from an image-side surface of the third lens to an object-side surface of the fourth lens, and D45 is a distance along the optical axis from an image-side surface of the fourth lens to an object-side surface of the fifth lens.

The imaging lens system may satisfy the conditional expression $2.8<(\text{R6+R7})/(\text{R6-R7})<5.8$, where R6 is a radius of curvature of an image-side surface of the third lens at the optical axis, and R7 is a radius of curvature of an object-side surface of the fourth lens at the optical axis.

The imaging lens system may satisfy the conditional expression $-0.10<(\text{R8+R9})/(\text{R8-R9})<0.3$, where R8 is a radius of curvature of an image-side surface of the fourth lens at the optical axis, and R9 is a radius of curvature of an object-side surface of the fifth lens at the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figures 1, 2:
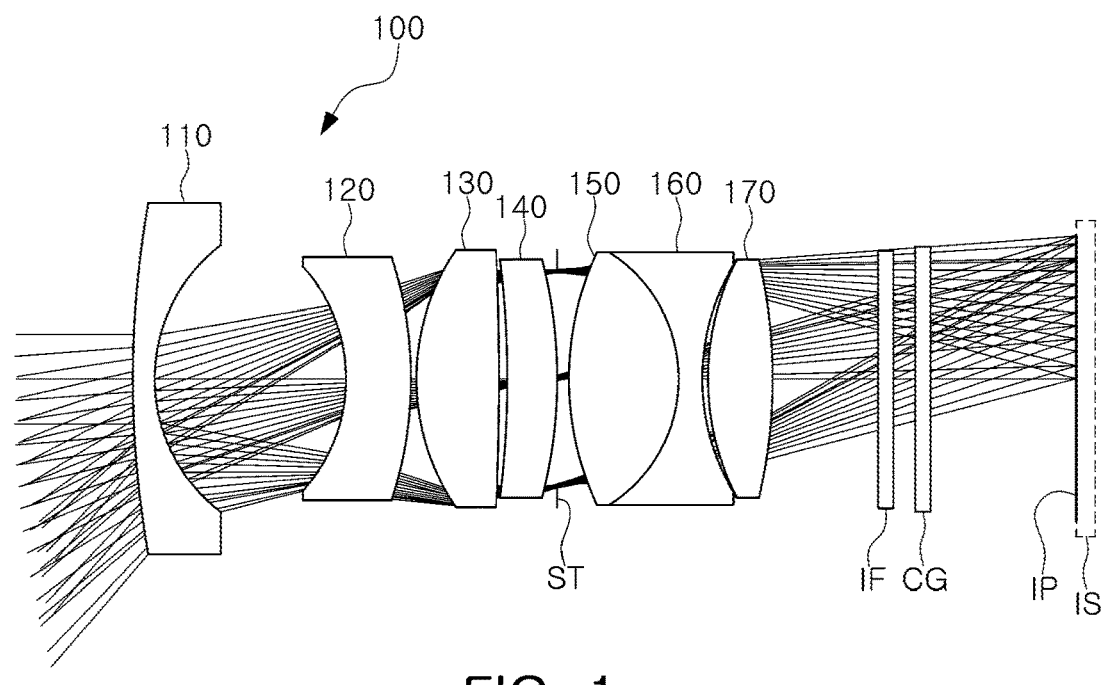
FIG. 1 is a diagram illustrating a first embodiment of an imaging lens system.
FIG. 2 is aberration curves of the imaging lens system illustrated in FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90° or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

In the drawings, thicknesses, sizes, and shapes of lenses may have been slightly exaggerated for convenience of explanation. In particular, shapes of spherical surfaces or aspherical surfaces illustrated in the drawings are illustrated by way of example. That is, the shapes of the spherical surfaces or the aspherical surfaces are not limited to those illustrated in the drawings.

In the embodiments described herein, a first lens refers to a lens closest to an object (or a subject), and a seventh lens refers to a lens closest to an imaging plane (or an image sensor).

A unit of radiuses of curvature of lens surfaces, thicknesses of lenses and other optical elements, gaps between lenses and other optical elements, TTL (a distance from an object-side surface of the first lens to the imaging plane), BFL (a distance from an image-side surface of the seventh lens to the imaging plane), ImgH (a maximum effective image height on the imaging plane, which is equal to one half of a diagonal length of an effective imaging area of the imaging plane), focal lengths, and effective radiuses of surfaces of lenses and other optical elements are expressed in millimeters (mm).

Thicknesses of lenses and other optical elements, gaps between lenses and other optical elements, TTL, and BFL are measured along an optical axis of the imaging lens system. Radiuses of curvature of lens surfaces are measured at the optical axis.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations sin θ≈θ, tan θ≈θ, and cos θ≈1 are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as convex, the entire object-side surface of the lens may not be convex, and a peripheral region of the object-side surface of the lens may be concave. Also, even though the image-side surface of the lens may be described as concave, the entire image-side surface of the lens may not be concave, and a peripheral region of the image-side surface of the lens may be convex.

An effective aperture radius or effective radius of a lens surface is a radius of a portion of the lens surface through which light actually passes, and is not necessarily a radius of an outer edge of the lens surface. Stated another way, the effective aperture radius or effective radius of a lens surface is a distance in a direction perpendicular to an optical axis of the lens surface between the optical axis and a marginal ray of light passing through the lens surface. The object-side surface of a lens and the image-side surface of the lens may have different effective aperture radiuses or effective radiuses.

The imaging lens system of the embodiments described herein may be configured to be mounted on a transportation device. For example, the imaging lens system may be mounted on a front and rear surveillance camera or an autonomous driving camera mounted on a passenger car, a truck, a fire truck, a forklift, or other transportation device. However, imaging lens system is not limited to the above-described examples. For example, the imaging lens system may be mounted on an imaging camera of a surveillance drone or a transportation drone.

An imaging lens system in a first embodiment may include a plurality of lenses. For example, the imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system.

The imaging lens system in the first embodiment may satisfy a specific conditional expression. For example, the imaging lens system in the first embodiment may satisfy a conditional expression of 0.13<ImgH/TTL<0.16, where ImgH is a maximum effective image height on the imaging plane and TTL is a distance along the optical axis from the object-side surface of the first lens to the imaging plane.

As another example, the imaging lens system in the first embodiment may satisfy a conditional expression of 5.3<TTL/f<5.5, where TTL is as described above and f is a focal length of the imaging lens system.

An imaging lens system in a second embodiment may include a plurality of lenses. For example, the imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system.

The imaging lens system in the second embodiment may include a lens having a predetermined refractive power. For example, the imaging lens system in the second embodiment may include a first lens having a negative refractive power and a second lens having a negative refractive power. The imaging lens system in the second embodiment may satisfy a specific conditional expression. For example, the imaging lens system in the second embodiment may satisfy a conditional expression 5.3<TTL/f<5.5, where TTL and f are as described above.

An imaging lens system in a third embodiment may be configured to satisfy one or more of the conditional expressions listed below. For example, the imaging lens system in the third embodiment may include seven lenses, and may satisfy two or more of the conditional expressions listed below. As another example, the imaging lens system in the third embodiment may include seven lenses, and may be configured to satisfy all of the conditional expressions listed below.

| | |
|---|---|
| $0.13 < ImgH/TTL < 0.16$ | (Conditional Expression 1) |
| $5.3 < TTL/f < 5.5$ | (Conditional Expression 2) |
| $0.49 \le |f/f3| < 0.6$ | (Conditional Expression 3) |
| $L1ER1/TTL < 0.5$ | (Conditional Expression 4) |
| $f2/f3 < 0$ | (Conditional Expression 5) |
| $f5/f6 < 0$ | (Conditional Expression 6) |
| $L1ER1/ImgH < 3.0$ | (Conditional Expression 7) |
| $25 < |V5 - V6|$ | (Conditional Expression 8) |
| $f56 < 0$ | (Conditional Expression 9) |
| $80° < HFOV < 90°$ | (Conditional Expression 10) |
| $94° < DFOV < 104°$ | (Conditional Expression 11) |

In the conditional expressions listed above, ImgH is a maximum effective image height on the imaging plane, TTL is a distance along the optical axis from an object-side surface of the first lens to the imaging plane, f is a focal length of the imaging lens system, f2 is a focal length of the second lens, f3 is a focal length of the third lens, f5 is a focal length of the fifth lens, f6 is a focal length of the sixth lens, L1ER1 is an effective radius of an object-side surface of the first lens, V5 is an Abbe number of the fifth lens, V6 is an Abbe number of the sixth lens, f56 is a combined focal length of the fifth and sixth lenses, HFOV is a field of view of the imaging plane in a horizontal direction expressed in degrees, and DFOV is a field of view of the imaging plane in a diagonal direction expressed in degrees.

The imaging lens system in the third embodiment may satisfy some of the conditional expressions listed above in a more limited manner as listed below:

| | |
|---|---|
| $0.26 < L1ER1/TTL < 0.46$ | (Conditional Expression 12) |
| $-2.0 < f2/f3 < -1.0$ | (Conditional Expression 13) |
| $-1.6 < f5/f6 < -1.2$ | (Conditional Expression 14) |
| $2.0 < L1ER1/ImgH < 3.0$ | (Conditional Expression 15) |
| $-100 < f56 < -18$ | (Conditional Expression 16) |

An imaging lens system in a fourth embodiment may be configured to satisfy one or more of the conditional expressions listed below. For example, the imaging lens system in the fourth embodiment may include seven lenses, and may satisfy two or more of the conditional expressions listed below. As another example, the imaging lens system in the fourth embodiment may include seven lenses and may be configured to satisfy all of the conditional expressions listed below:

| | |
|---|---|
| $1.6 < f\text{-number} < 1.9$ | (Conditional Expression 17) |
| $0.7 < ImgH/f < 1.0$ | (Conditional Expression 18) |
| $0.03 < D34/D12 < 0.20$ | (Conditional Expression 19) |
| $0.60 < D34/D45 < 3.0$ | (Conditional Expression 20) |
| $1.64 < SumNd/7 < 1.76$ | (Conditional Expression 21) |
| $24 < SumV/SumNd < 29$ | (Conditional Expression 22) |
| $2.8 < (R6+R7)/(R6-R7) < 5.8$ | (Conditional Expression 23) |
| $-0.10 < (R8+R9)/(R8-R9) < 0.3$ | (Conditional Expression 24) |
| $0.08 \text{ mm/}° < L1R1/HFOV < 0.140 \text{ mm/}°$ | (Conditional Expression 25) |

In the conditional expressions listed above, f-number is equal to the focal length f of the imaging lens system divided by an entrance pupil diameter of the imaging lens system and is a dimensionless quantity, D12 is a distance along the optical axis from an image-side surface of the first lens to an object-side surface of the second lens, D34 is a distance along the optical axis from an image-side surface of the third lens to an object-side surface of the fourth lens, D45 is a distance along the optical axis from an image-side surface of the fourth lens to an object-side surface of the fifth lens, SumV is a sum of the Abbe numbers of the first to seventh lenses, SumNd is a sum of the refractive indices of the first to seventh lenses, R6 is a radius of curvature of an image-side surface of the third lens, R7 is a radius of curvature of an object-side surface of the fourth lens, R8 is a radius of curvature of an image-side surface of the fourth lens, and R9 is a radius of curvature of an object-side surface of the fifth lens.

An imaging lens system in an embodiment may include one or more lenses having the properties described below. For example, the imaging lens system in the first embodiment may include one of the first to seventh lenses having the properties described below. As another example, the imaging lens system in the second to fourth embodiments may include one or more of the first to seventh lenses having the properties described below. However, the imaging lens system in the aforementioned embodiments does not necessarily include a lens having the properties described below. Hereinafter, the first to seventh lenses will be described.

The first lens may have a refractive power. For example, the first lens may have a negative refractive power. One surface of the first lens may be convex. For example, the first lens may have a convex object-side surface. The first lens may include a spherical surface. For example, both surfaces of the first lens may be spherical. The first lens may be formed of a material having a high light transmissivity and an excellent workability. For example, the first lens may be formed of a plastic material or a glass material. The first lens may be configured to have a predetermined refractive index. For example, the refractive index of the first lens may be greater than 1.7. For example, the refractive index of the first lens may be greater than 1.70 and less than 1.8. However, the refractive index of the first lens is not limited to the above-described range. For example, the first lens may have a refractive index of less than 1.7 only when the refractive index of the second lens is greater than 1.9. The first lens may have a predetermined Abbe number. For example, the Abbe number of the first lens may be 40 or more. For example, the Abbe number of the first lens may be greater than 40 and less than 82.

The second lens may have a refractive power. For example, the second lens may have a negative refractive power. One surface of the second lens may be concave. For example, the second lens may have a concave object-side surface. The second lens may include an aspherical surface. For example, both surfaces of the second lens may be aspherical. The second lens may be formed of a material having a high light transmissivity and an excellent workability. For example, the second lens may be formed of a plastic material or a glass material. The second lens may be configured to have a predetermined refractive index. For example, the refractive index of the second lens may be greater than 1.5. For example, the refractive index of the second lens may be greater than 1.56 and less than 1.92. The second lens may have a predetermined Abbe number. For example, the Abbe number of the second lens may be 20 or more. For example, the Abbe number of the second lens may be greater than 20 and less than 40.

The third lens may have a refractive power. For example, the third lens may have a positive refractive power. One surface of the third lens may be convex. For example, the third lens may have a convex object-side surface or a convex image-side surface. The third lens may include an aspherical surface. For example, both surfaces of the third lens may be aspherical. The third lens may be formed of a material having a high light transmissivity and an excellent workability. For example, the third lens may be formed of a plastic material or a glass material. The third lens may be configured to have a predetermined refractive index. For example, the refractive index of the third lens may be greater than 1.6 and less than 1.9. The third lens may have a predetermined Abbe number. For example, the Abbe number of the third lens may be greater than 20 and less than 30.

The fourth lens may have a refractive power. For example, the fourth lens may have a positive refractive power. One surface of the fourth lens may be convex. For example, the fourth lens may have a convex image-side surface. The fourth lens may include a spherical surface. For example, both surfaces of the fourth lens may be spherical. The fourth lens may be formed of a material having a high light transmissivity and an excellent workability. For example, the fourth lens may be formed of a plastic material or a glass material. The fourth lens may be configured to have a predetermined refractive index. For example, the refractive index of the fourth lens may be greater than 1.46 and less than 1.64. The fourth lens may have a predetermined Abbe number. For example, the Abbe number of the fourth lens may be greater than 56 and less than 90.

The fifth lens may have a refractive power. For example, the fifth lens may have a positive refractive power. One surface of the fifth lens may be convex. For example, the fifth lens may have a convex object-side surface. The fifth lens may include a spherical surface. For example, both surfaces of the fifth lens may be spherical. The fifth lens may be formed of a material having a high light transmissivity and an excellent workability. For example, the fifth lens may be formed of a plastic material or a glass material. The fifth lens may be configured to have a predetermined refractive index. For example, the refractive index of the fifth lens may be greater than 1.56. For example, the refractive index of the fifth lens may be greater than 1.56 and less than 1.70. The fifth lens may have a predetermined Abbe number. For example, the Abbe number of the fifth lens may be 50 or more. For example, the Abbe number of the fifth lens may be greater than 52 and less than 64.

The sixth lens may have a refractive power. For example, the sixth lens may have a negative refractive power. One surface of the sixth lens may be concave. As an example, the sixth lens may have a concave object-side surface. The sixth lens may include a spherical surface. For example, both surfaces of the sixth lens may be spherical. The sixth lens may be formed of a material having a high light transmissivity and an excellent workability. For example, the sixth lens may be formed of a plastic material or a glass material. The sixth lens may be configured to have a predetermined refractive index. For example, the refractive index of the sixth lens may be greater than 1.70 and less than 1.80. The sixth lens may have a predetermined Abbe number. For example, the Abbe number of the sixth lens may be greater than 20 and less than 30.

The seventh lens may have a refractive power. For example, the seventh lens may have a positive refractive power. One surface of the seventh lens may be convex. For example, the seventh lens may have a convex image-side surface. The seventh lens may include an aspherical surface. For example, both surfaces of the seventh lens may be aspherical. The seventh lens may include an inflection point. For example, an inflection point may be formed on at least one of an object-side surface and an image-side surface of the seventh lens. The seventh lens may be formed of a material having a high light transmissivity and an excellent workability. For example, the seventh lens may be formed of a plastic material or a glass material. The seventh lens may be configured to have a predetermined refractive index. For example, the refractive index of the seventh lens may be greater than 1.60 and less than 1.90. The seventh lens may have a predetermined Abbe number. For example, the Abbe number of the seventh lens may be greater than 40 and less than 64.

The first to seventh lenses may include a spherical surface or an aspherical surface as described above. The aspherical surfaces of the lenses may be represented by Equation 1 below.

$$Z = \frac{cr^2}{1 + \sqrt{1 - (1+k)c^2r^2}} + Ar^4 + \tag{1}$$

-continued
$$Br^6 + Cr^8 + Dr^{10} + Er^{12} + Fr^{14} + Gr^{16} + Hr^{18} + Jr^{20}$$

In Equation 1, c is a curvature of a lens surface and is equal to a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A, B, C, D, E, F, G, H, and J are aspherical constants, Z (or sag) is a distance in a direction parallel to the optical axis of the lens surface from the point on the lens surface at the distance r from the optical axis of the lens surface to a tangential plane perpendicular to the optical axis and intersecting a vertex of the lens surface.

The imaging lens system in the embodiments described above may further include a stop, a filter, and a cover glass. As an example, the imaging lens system may further include a stop disposed between the fourth lens and the fifth lens. As another example, the imaging lens system may further include a filter and a cover glass disposed between the seventh lens and the imaging plane. The stop may be configured to adjust the amount of light incident on the imaging plane. The filter may be configured to block a specific wavelength of light or a specific range of wavelengths of light, and the cover glass may be configured to block foreign substances from reaching the imaging plane. As an example, the filter may be configured to block infrared light, but may additionally or alternatively be configured to block ultraviolet light.

FIG. 1 is a diagram illustrating a first embodiment of an imaging lens system, and FIG. 2 is aberration curves of the imaging lens system illustrated in FIG. 1.

Referring to FIG. 1, an imaging lens system 100 may include a first lens 110, a second lens 120, a third lens 130, a fourth lens 140, a fifth lens 150, a sixth lens 160, and a seventh lens 170.

The first lens 110 may have a negative refractive power, and may have a convex object-side surface and a concave image-side surface. The second lens 120 may have a negative refractive power, and may have a concave object-side surface and a convex image-side surface. The third lens 130 may have a positive refractive power, and may have a convex object-side surface and a convex image-side surface. The fourth lens 140 may have a positive refractive power, and may have a concave object-side surface and a convex image-side surface. The fifth lens 150 may have a positive refractive power, and may have a convex object-side surface and a convex image-side surface. The sixth lens 160 may have a negative refractive power, and may have a concave object-side surface and a concave image-side surface. The seventh lens 170 may have a positive refractive power, and may have a convex object-side surface and a convex image-side surface. An inflection point may be formed on the image-side surface of the seventh lens 170. The fifth lens 150 and the sixth lens 160 may be bonded to each other. In greater detail, a radius of curvature of the image-side surface of the fifth lens 150 and a radius of curvature of the object-side surface of the sixth lens 160 may be configured to be substantially the same, and the image-side surface of the fifth lens 150 may be in contact with the object-side surface of the sixth lens 160 in a center of the optical axis.

The imaging lens system 100 may further include a stop ST, a filter IF, a cover glass CG, and an imaging plane IP. The stop ST may be disposed between the fourth lens 140 and the fifth lens 150, and the filter IF and the cover glass CG may be disposed between the seventh lens 170 and the imaging plane IP. The imaging plane IP may be formed in at a position at which light incident through the first lens 110 to the seventh lens 170 is focused. For example, the imaging plane IP may be formed on one surface of an image sensor IS of a camera module or within the image sensor IS.

Tables 1 and 2 below list the lens properties and aspherical values of the first embodiment of the imaging lens system.

have a negative refractive power, and may have a concave object-side surface and a concave image-side surface. The seventh lens 270 may have a positive refractive power, and may have a convex object-side surface and a convex image-side surface. An inflection point may be formed on the image-side surface of the seventh lens 270. The fifth lens 250 and the sixth lens 260 may be bonded to each other. In greater detail, a radius of curvature of the image-side surface of the fifth lens 250 and a radius of curvature of the

TABLE 1

| Surface No. | Component | Radius of Curvature | Thickness/ Distance | Refractive Index | Abbe Number | Effective Radius |
|---|---|---|---|---|---|---|
| S1 | First Lens | 27.2287 | 0.6000 | 1.777 | 49.6 | 4.692 |
| S2 | | 4.5548 | 4.9502 | | | 3.542 |
| S3 | Second Lens | −3.3431 | 1.6907 | 1.601 | 30.4 | 3.003 |
| S4 | | −6.6665 | 0.1000 | | | 3.269 |
| S5 | Third Lens | 6.2933 | 2.1939 | 1.618 | 26.3 | 3.423 |
| S6 | | −36.9517 | 0.1906 | | | 3.208 |
| S7 | Fourth Lens | −24.3693 | 1.3176 | 1.623 | 60.3 | 3.186 |
| S8 | | −12.5741 | 0.0000 | | | 3.024 |
| S9 | Stop | Infinity | 0.3000 | | | 2.865 |
| S10 | Fifth Lens | 8.2508 | 2.8899 | 1.618 | 60.6 | 3.025 |
| S11 | Sixth Lens | −3.9900 | 0.6000 | 1.749 | 28.1 | 2.984 |
| S12 | | 6.6444 | 0.1000 | | | 3.105 |
| S13 | Seventh Lens | 7.7338 | 1.6902 | 1.650 | 55.5 | 3.132 |
| S14 | | −10.2819 | 2.7218 | | | 3.186 |
| S15 | Filter | Infinity | 0.4000 | 1.519 | 64.2 | 3.432 |
| S16 | | Infinity | 0.5500 | | | 3.454 |
| S17 | Cover Glass | Infinity | 0.4000 | 1.519 | 64.2 | 3.498 |
| S18 | | Infinity | 3.8036 | | | 3.519 |
| S19 | Imaging Plane | Infinity | 0.0015 | | | 3.827 |

TABLE 2

| Surface No. | S3 | S4 | S5 | S6 | S13 | S14 |
|---|---|---|---|---|---|---|
| k | −1.26022E+00 | −2.71647E+00 | −2.04937E−01 | −5.87526E+01 | 0.00000E+00 | 0.00000E+00 |
| A | 2.59351E−03 | 2.46173E−03 | −1.65008E−05 | −1.57045E−04 | 2.44654E−04 | 1.10893E−03 |
| B | −1.10782E−04 | −2.47393E−05 | 2.58956E−05 | 6.35081E−05 | 2.80354E−05 | 3.28342E−05 |
| C | 5.54083E−07 | −6.16987E−07 | 7.87004E−08 | −1.02142E−06 | −7.33986E−07 | 2.71772E−07 |
| D | 0 | 0 | 0 | 0 | 4.00308E−08 | 4.64438E−08 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 3:
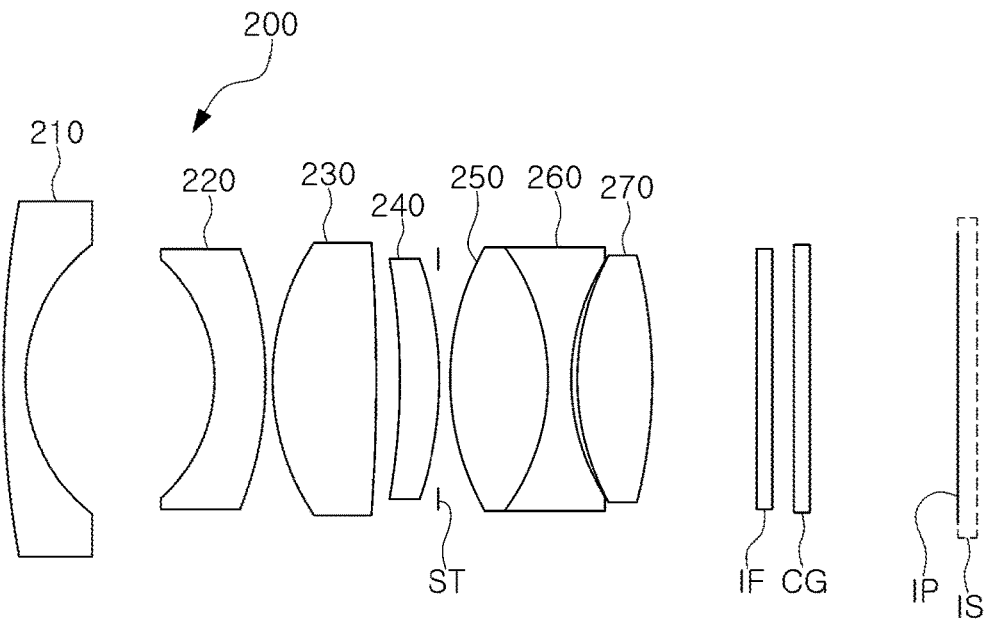
FIG. 3 is a diagram illustrating a second embodiment of an imaging lens system.
Figure 4:
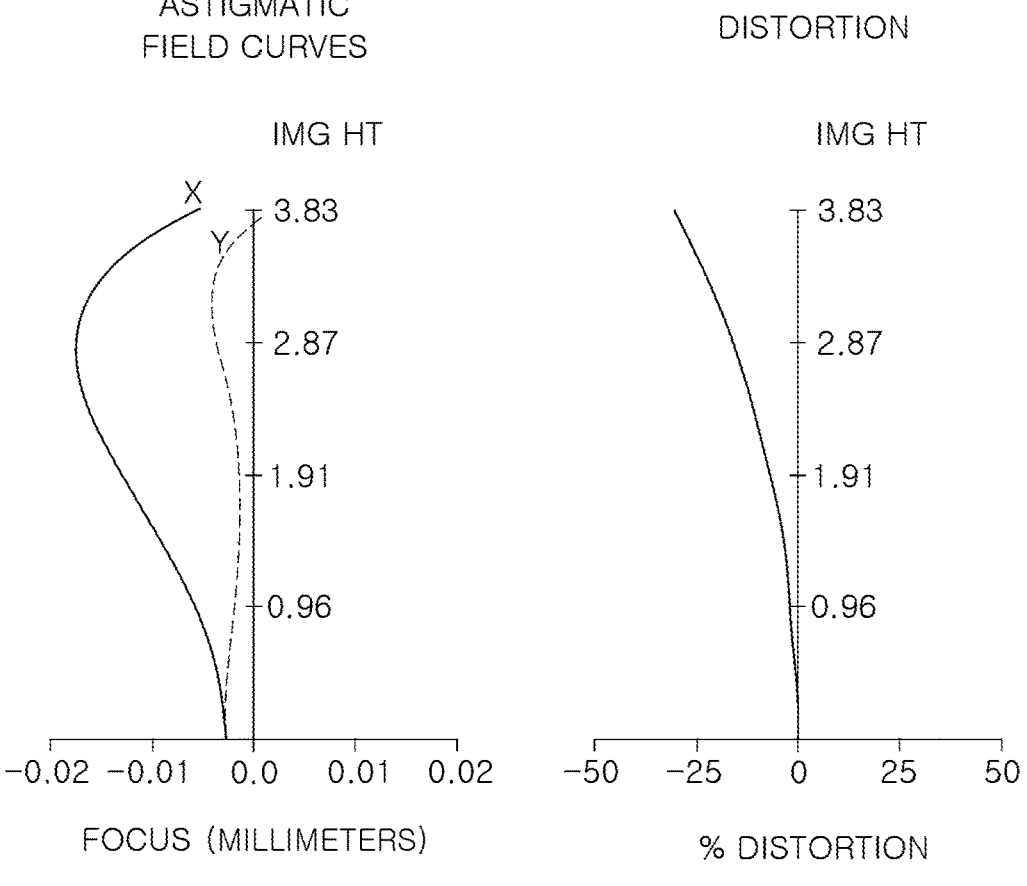
FIG. 4 is aberration curves of the imaging lens system illustrated in FIG. 3.

FIG. 3 is a diagram illustrating a second embodiment of an imaging lens system, and FIG. 4 is aberration curves of the imaging lens system illustrated in FIG. 3.

Referring to FIG. 3, an imaging lens system 200 may include a first lens 210, a second lens 220, a third lens 230, a fourth lens 240, a fifth lens 250, a sixth lens 260, and a seventh lens 270.

The first lens 210 may have a negative refractive power, and may have a convex object-side surface and a concave image-side surface. The second lens 220 may have a negative refractive power, and may have a concave object-side surface and a convex image-side surface. The third lens 230 may have a positive refractive power, and may have a convex object-side surface and a convex image-side surface. The fourth lens 240 may have a positive refractive power, and may have a concave object-side surface and a convex image-side surface. The fifth lens 250 may have a positive refractive power, and may have a convex object-side surface and a convex image-side surface. The sixth lens 260 may object-side surface of the sixth lens 260 may be configured to be substantially the same, and the image-side surface of the fifth lens 250 may be in contact with the object-side surface of the sixth lens 260 in a center of the optical axis.

The imaging lens system 200 may further include a stop ST, a filter IF, a cover glass CG, and an imaging plane IP. The stop ST may be disposed between the fourth lens 240 and the fifth lens 250, and the filter IF and the cover glass CG may be disposed between the seventh lens 270 and the imaging plane IP. The imaging plane IP may be formed at a position at which light incident through the first lens 210 to the seventh lens 270 is focused. For example, the imaging plane IP may be formed on one surface of an image sensor IS of a camera module or within the image sensor IS.

Tables 3 and 4 below list the lens properties and aspherical values of the second embodiment of the imaging lens system.

TABLE 3

| Surface No. | Component | Radius of Curvature | Thickness/ Distance | Refractive Index | Abbe Number | Effective Radius |
|---|---|---|---|---|---|---|
| S1 | First Lens | 34.2208 | 0.6000 | 1.777 | 49.6 | 4.708 |
| S2 | | 4.6587 | 4.8374 | | | 3.569 |
| S3 | Second Lens | −2.9907 | 1.3789 | 1.586 | 34.7 | 3.135 |
| S4 | | −5.2871 | 0.1000 | | | 3.425 |
| S5 | Third Lens | 6.7569 | 2.6405 | 1.608 | 28.0 | 3.589 |
| S6 | | −29.2590 | 0.6275 | | | 3.287 |
| S7 | Fourth Lens | −18.2154 | 1.0150 | 1.535 | 66.0 | 3.156 |
| S8 | | −10.2202 | 0.0000 | | | 3.054 |
| S9 | Stop | Infinity | 0.3000 | | | 2.865 |
| S10 | Fifth Lens | 7.2801 | 2.4907 | 1.606 | 61.3 | 3.114 |
| S11 | Sixth Lens | −6.0000 | 0.6000 | 1.762 | 27.6 | 3.080 |
| S12 | | 6.0978 | 0.1000 | | | 3.127 |
| S13 | Seventh Lens | 7.0663 | 1.9275 | 1.623 | 60.3 | 3.157 |
| S14 | | −10.4315 | 2.7218 | | | 3.221 |
| S15 | Filter | Infinity | 0.4000 | 1.519 | 64.2 | 3.454 |
| S16 | | Infinity | 0.5500 | | | 3.474 |
| S17 | Cover Glass | Infinity | 0.4000 | 1.519 | 64.2 | 3.515 |
| S18 | | Infinity | 3.8082 | | | 3.535 |
| S19 | Imaging Plane | Infinity | 0.0000 | | | 3.827 |

TABLE 4

| Surface No. | S3 | S4 | S5 | S6 | S13 | S14 |
|---|---|---|---|---|---|---|
| k | −1.34648E+00 | −2.44187E+00 | −2.42564E−01 | −7.80509E+01 | 0.00000E+00 | 0.00000E+00 |
| A | 2.77606E−03 | 2.42651E−03 | −5.40172E−05 | −9.03204E−05 | 3.37739E−04 | 1.09522E−03 |
| B | −1.20855E−04 | −2.00450E−05 | 2.86947E−05 | 6.42230E−05 | 2.89340E−05 | 3.44935E−05 |
| C | 2.09243E−07 | −1.37096E−06 | 1.94235E−07 | −5.88885E−08 | −9.00864E−07 | −3.86445E−08 |
| D | 0 | 0 | 0 | 0 | 3.40525E−08 | 4.16807E−08 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 5:
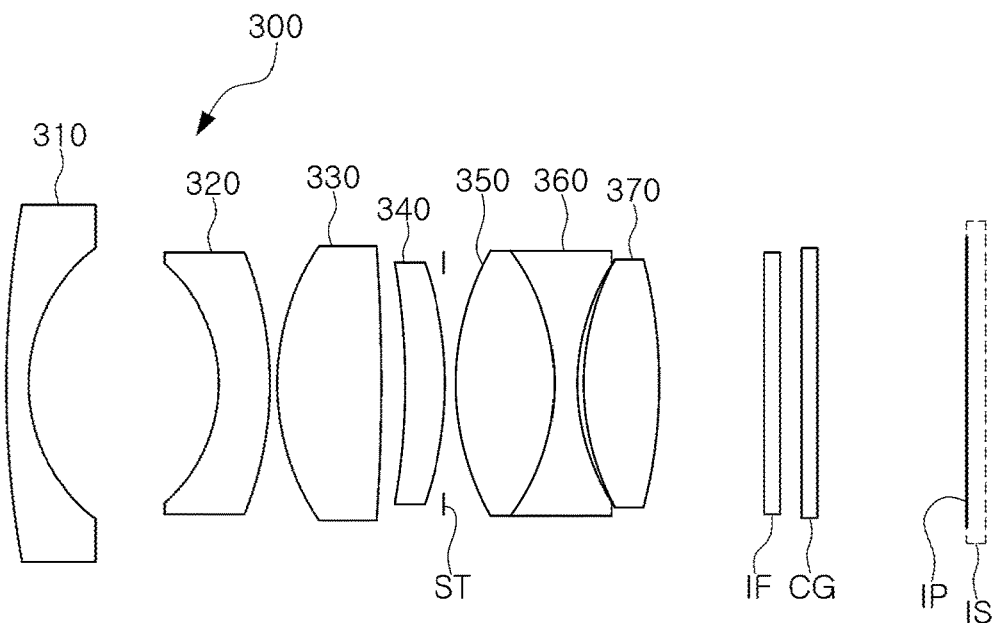
FIG. 5 is a diagram illustrating a third embodiment of an imaging lens system.
Figure 6:
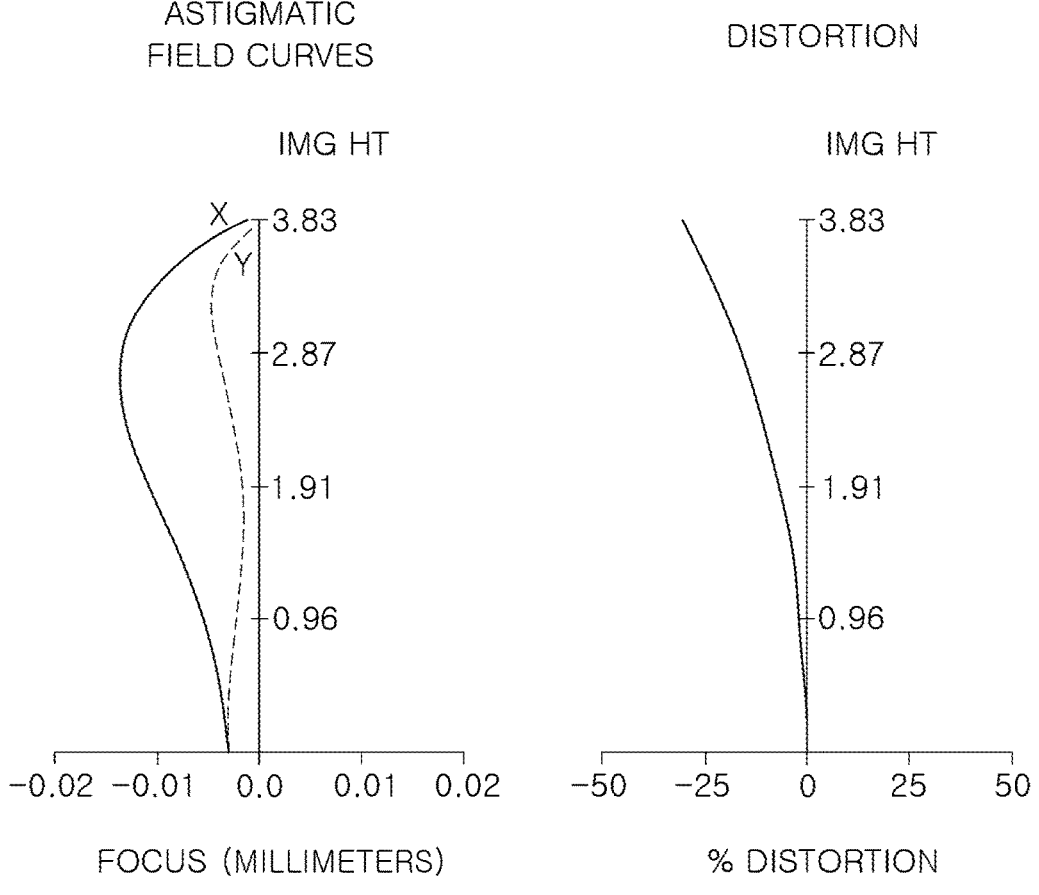
FIG. 6 is aberration curves of the imaging lens system illustrated in FIG. 5.

FIG. 5 is a diagram illustrating a third embodiment of an imaging lens system, and FIG. 6 is aberration curves of the imaging lens system illustrated in FIG. 5.

Referring to FIG. 5, an imaging lens system 300 may include a first lens 310, a second lens 320, a third lens 330, a fourth lens 340, a fifth lens 350, a sixth lens 360, and a seventh lens 370.

The first lens 310 may have a negative refractive power, and may have a convex object-side surface and a concave image-side surface. The second lens 320 may have a negative refractive power, and may have a concave object-side surface and a convex image-side surface. The third lens 330 may have a positive refractive power, and may have a convex object-side surface and a convex image-side surface. The fourth lens 340 may have a positive refractive power, and may have a concave object-side surface and a convex image-side surface. The fifth lens 350 may have a positive refractive power, and may have a convex object-side surface and a convex image-side surface. The sixth lens 360 may have a negative refractive power, and may have a concave object-side surface and a concave image-side surface. The seventh lens 370 may have a positive refractive power, and may have a convex object-side surface and a convex image-side surface. An inflection point may be formed on the image-side surface of the seventh lens 370. The fifth lens 350 and the sixth lens 360 may be bonded to each other. In greater detail, a radius of curvature of the image-side surface of the fifth lens 350 and a radius of curvature of the object-side surface of the sixth lens 360 may be configured to be substantially the same, and the image-side surface of the fifth lens 350 may be in contact with the object-side surface of the sixth lens 360 in a center of the optical axis.

The imaging lens system 300 may further include a stop ST, a filter IF, a cover glass CG, and an imaging plane IP. The stop ST may be disposed between the fourth lens 340 and the fifth lens 350, and the filter IF and the cover glass CG may be disposed between the seventh lens 370 and the imaging plane IP. The imaging plane IP may be formed at a position at which light incident through the first lens 310 to the seventh lens 370 is focused. For example, the imaging plane IP may be formed on one surface of an image sensor IS of a camera module or within the image sensor IS.

Tables 5 and 6 below list the lens properties and aspherical values of the third embodiment of the imaging lens system.

TABLE 5

| Surface No. | Component | Radius of Curvature | Thickness/ Distance | Refractive Index | Abbe Number | Effective Radius |
|---|---|---|---|---|---|---|
| S1 | First Lens | 23.1884 | 0.6500 | 1.777 | 49.6 | 4.789 |
| S2 | | 4.5162 | 5.1326 | | | 3.578 |
| S3 | Second Lens | −3.2754 | 1.4695 | 1.722 | 30.7 | 2.979 |

TABLE 5-continued

| Surface No. | Component | Radius of Curvature | Thickness/ Distance | Refractive Index | Abbe Number | Effective Radius |
|---|---|---|---|---|---|---|
| S4 | | −6.1331 | 0.1000 | | | 3.261 |
| S5 | Third Lens | 6.9693 | 2.5463 | 1.699 | 27.9 | 3.421 |
| S6 | | −28.5661 | 0.5409 | | | 3.184 |
| S7 | Fourth Lens | −19.2482 | 0.8799 | 1.559 | 65.5 | 3.090 |
| S8 | | −10.0461 | 0.0000 | | | 3.052 |
| S9 | Stop | Infinity | 0.3000 | | | 2.993 |
| S10 | Fifth Lens | 8.7504 | 2.8431 | 1.609 | 57.8 | 2.981 |
| S11 | Sixth Lens | −4.4919 | 0.6500 | 1.753 | 26.1 | 2.937 |
| S12 | | 7.6962 | 0.1000 | | | 3.078 |
| S13 | Seventh Lens | 9.9616 | 1.5838 | 1.648 | 53.5 | 3.081 |
| S14 | | −9.5299 | 2.7218 | | | 3.146 |
| S15 | Filter | Infinity | 0.4000 | 1.519 | 64.2 | 3.416 |
| S16 | | Infinity | 0.5500 | | | 3.439 |
| S17 | Cover Glass | Infinity | 0.4000 | 1.519 | 64.2 | 3.486 |
| S18 | | Infinity | 3.6292 | | | 3.509 |
| S19 | Imaging Plane | Infinity | 0.0000 | | | 3.826 |

TABLE 6

| Surface No. | S3 | S4 | S5 | S6 | S13 | S14 |
|---|---|---|---|---|---|---|
| k | −1.37253E+00 | −2.57160E+00 | −2.68985E−01 | −5.58542E+01 | 0.00000E+00 | 0.00000E+00 |
| A | 2.81547E−03 | 2.46100E−03 | −6.51837E−05 | −8.20675E−05 | 3.68914E−04 | 1.04387E−03 |
| B | −1.27300E−04 | −2.23332E−05 | 2.75520E−05 | 5.79077E−05 | 3.20447E−05 | 3.14249E−05 |
| C | 1.40530E−06 | −1.41928E−06 | −3.23353E−07 | −7.82116E−07 | −1.32687E−07 | 1.64455E−06 |
| D | −7.30335E−08 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 7:
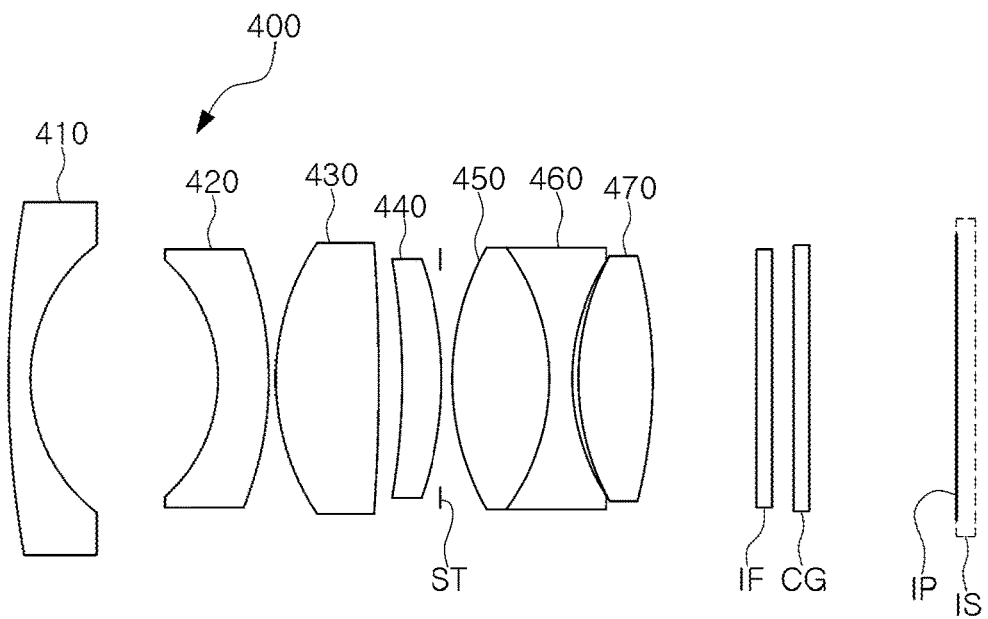
FIG. 7 is a diagram illustrating a fourth embodiment of an imaging lens system.
Figure 8:
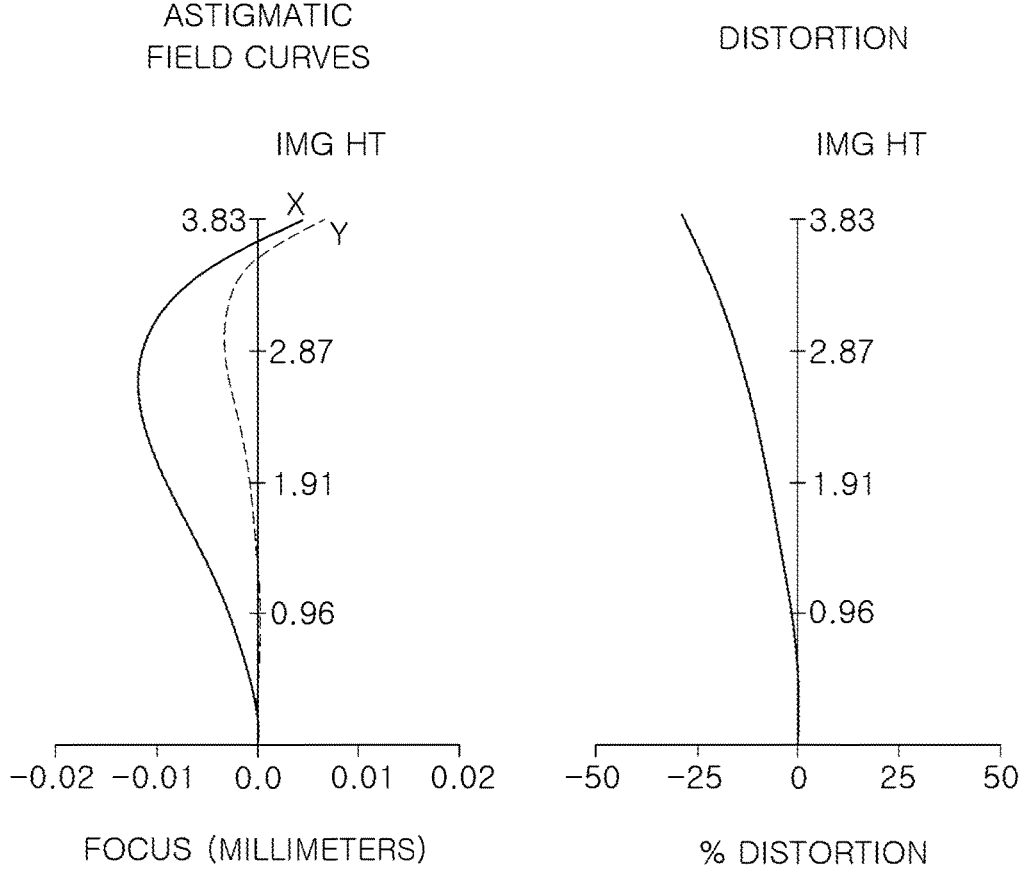
FIG. 8 is aberration curves of the imaging lens system illustrated in FIG. 7.

FIG. 7 is a diagram illustrating a fourth embodiment of an imaging lens system, and FIG. 8 is aberration curves of the imaging lens system illustrated in FIG. 7.

Referring to FIG. 7, an imaging lens system 400 may include a first lens 410, a second lens 420, a third lens 430, a fourth lens 440, a fifth lens 450, a sixth lens 460, and a seventh lens 470.

The first lens 410 may have a negative refractive power, and may have a convex object-side surface and a concave image-side surface. The second lens 420 may have a negative refractive power, and may have a concave object-side surface and a convex image-side surface. The third lens 430 may have a positive refractive power, and may have a convex object-side surface and a convex image-side surface. The fourth lens 440 may have a positive refractive power, and may have a concave object-side surface and a convex image-side surface. The fifth lens 450 may have a positive refractive power, and may have a convex object-side surface and a convex image-side surface. The sixth lens 460 may have a negative refractive power, and may have a concave object-side surface and a concave image-side surface. The seventh lens 470 may have a positive refractive power, and may have a convex object-side surface and a convex image-side surface. An inflection point may be formed on the image-side surface of the seventh lens 470. The fifth lens 450 and the sixth lens 460 may be bonded to each other. In greater detail, a radius of curvature of the image-side surface of the fifth lens 450 and a radius of curvature of the object-side surface of the sixth lens 460 may be configured to be substantially the same, and the image-side surface of the fifth lens 450 may be in contact with the object-side surface of the sixth lens 460 in a center of the optical axis.

The imaging lens system 400 may further include a stop ST, a filter IF, a cover glass CG, and an imaging plane IP. The stop ST may be disposed between the fourth lens 440 and the fifth lens 450, and the filter IF and the cover glass CG may be disposed between the seventh lens 470 and the imaging plane IP. The imaging plane IP may be formed at a position at which light incident through the first lens 410 to the seventh lens 470 is focused. For example, the imaging plane IP may be formed on one surface of an image sensor IS of a camera module or within the image sensor IS.

Tables 7 and 8 below list the lens properties and aspherical values of the fourth embodiment of the imaging lens system.

TABLE 7

| Surface No. | Component | Radius of Curvature | Thickness/ Distance | Refractive Index | Abbe Number | Effective Radius |
|---|---|---|---|---|---|---|
| S1 | First Lens | 16.3708 | 0.6000 | 1.777 | 49.6 | 4.972 |
| S2 | | 4.5113 | 5.1140 | | | 3.716 |
| S3 | Second Lens | −3.5483 | 1.6447 | 1.877 | 31.1 | 3.057 |
| S4 | | −7.1741 | 0.2664 | | | 3.347 |
| S5 | Third Lens | 6.9348 | 2.0886 | 1.713 | 27.7 | 3.573 |

TABLE 7-continued

| Surface No. | Component | Radius of Curvature | Thickness/ Distance | Refractive Index | Abbe Number | Effective Radius |
|---|---|---|---|---|---|---|
| S6 | | −30.0100 | 0.6818 | | | 3.394 |
| S7 | Fourth Lens | −19.4052 | 0.8931 | 1.542 | 69.0 | 3.224 |
| S8 | | −10.7718 | 0.0000 | | | 3.128 |
| S9 | Stop | Infinity | 0.3000 | | | 2.928 |
| S10 | Fifth Lens | 8.5417 | 3.1464 | 1.607 | 58.0 | 3.107 |
| S11 | Sixth Lens | −4.2751 | 0.6000 | 1.749 | 25.7 | 3.070 |
| S12 | | 7.7675 | 0.1006 | | | 3.214 |
| S13 | Seventh Lens | 10.2983 | 1.4257 | 1.735 | 47.1 | 3.214 |
| S14 | | −10.5262 | 2.7218 | | | 3.245 |
| S15 | Filter | Infinity | 0.4000 | 1.519 | 64.2 | 3.473 |
| S16 | | Infinity | 0.5500 | | | 3.493 |
| S17 | Cover Glass | Infinity | 0.4000 | 1.519 | 64.2 | 3.534 |
| S18 | | Infinity | 3.5669 | | | 3.554 |
| S19 | Imaging Plane | Infinity | 0.0000 | | | 3.832 |

TABLE 8

| Surface No. | S3 | S4 | S5 | S6 | S13 | S14 |
|---|---|---|---|---|---|---|
| k | −1.41513E+00 | −2.61666E+00 | −2.77108E−01 | −5.37751E+01 | 0.00000E+00 | 0.00000E+00 |
| A | 2.91518E−03 | 2.47729E−03 | −6.87241E−05 | −1.06289E−04 | 4.31147E−04 | 1.10599E−03 |
| B | −1.23618E−04 | −2.08587E−05 | 2.69573E−05 | 5.39755E−05 | 2.95271E−05 | 3.56385E−05 |
| C | 1.81365E−06 | −1.19453E−06 | −3.27656E−07 | −8.91816E−07 | 1.79876E−07 | 1.74588E−06 |
| D | −5.62274E−08 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 9:
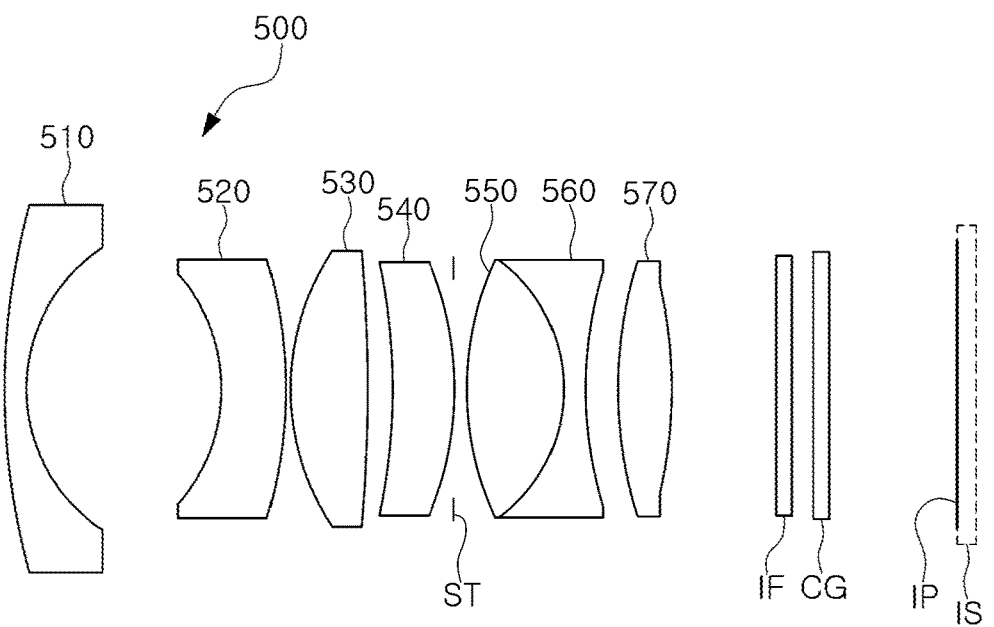
FIG. 9 is a diagram illustrating a fifth embodiment of an imaging lens system.
Figure 10:
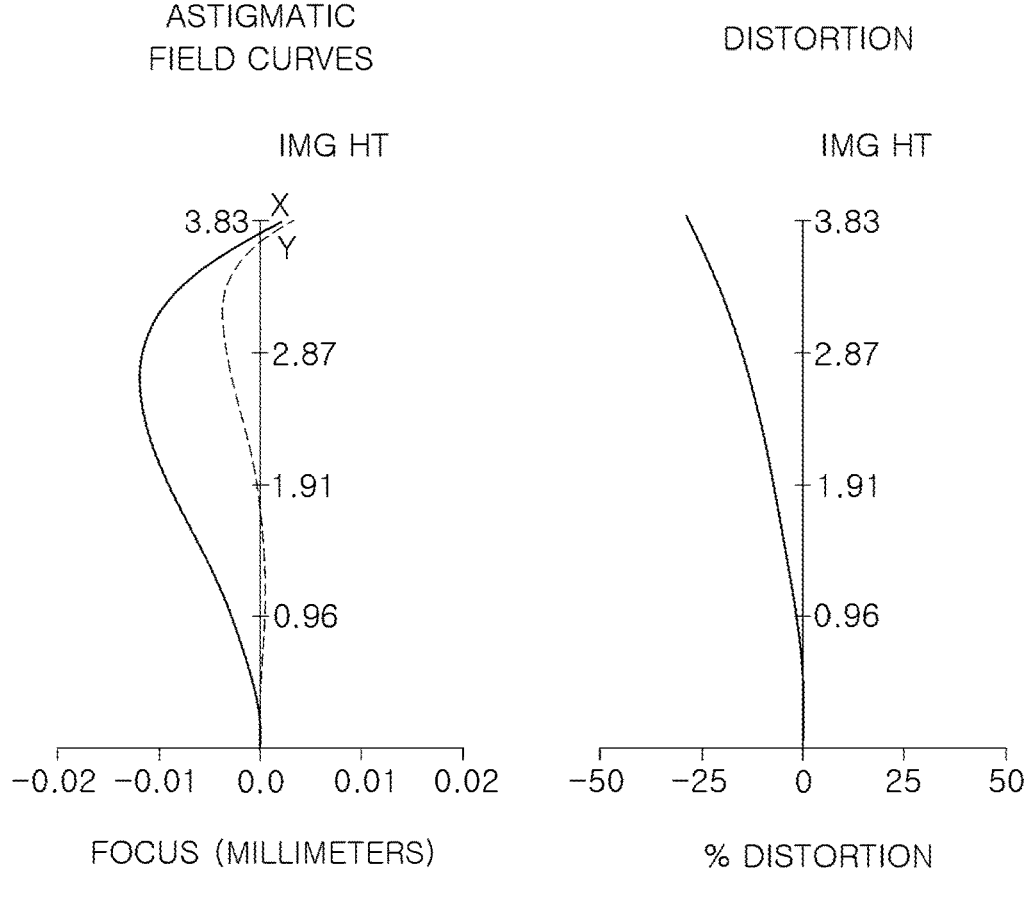
FIG. 10 is aberration curves of the imaging lens system illustrated in FIG. 9.

FIG. 9 is a diagram illustrating a fifth embodiment of an imaging lens system, and FIG. 10 is aberration curves of the imaging lens system illustrated in FIG. 9.

Referring to FIG. 9, an imaging lens system 500 may include a first lens 510, a second lens 520, a third lens 530, a fourth lens 540, a fifth lens 550, a sixth lens 560, and a seventh lens 570.

The first lens 510 may have a negative refractive power, and may have a convex object-side surface and a concave image-side surface. The second lens 520 may have a negative refractive power, and may have a concave object-side surface and a convex image-side surface. The third lens 530 may have a positive refractive power, and may have a convex object-side surface and a convex image-side surface. The fourth lens 540 may have a positive refractive power, and may have a concave object-side surface and a convex image-side surface. The fifth lens 550 may have a positive refractive power, and may have a convex object-side surface and a convex image-side surface. The sixth lens 560 may have a negative refractive power, and may have a concave object-side surface and a concave image-side surface. The seventh lens 570 may have a positive refractive power, and may have a convex object-side surface and a convex image-side surface. An inflection point may be formed on the image-side surface of the seventh lens 570. The fifth lens 550 and the sixth lens 560 may be bonded to each other. In greater detail, a radius of curvature of the image-side surface of the fifth lens 550 and a radius of curvature of the object-side surface of the sixth lens 560 may be configured to be substantially the same, and the image-side surface of the fifth lens 550 may be in contact with the object-side surface of the sixth lens 560 in a center of the optical axis.

The imaging lens system 500 may further include a stop ST, a filter IF, a cover glass CG, and an imaging plane IP. The stop ST may be disposed between the fourth lens 540 and the fifth lens 550, and the filter IF and the cover glass CG may be disposed between the seventh lens 570 and the imaging plane IP. The imaging plane IP may be formed at a position at which light incident through the first lens 510 to the seventh lens 570 is focused. For example, the imaging plane IP may be formed on one surface of an image sensor IS of a camera module or within the image sensor IS.

Tables 9 and 10 below list the lens properties and aspherical values of the fifth embodiment of the imaging lens system.

TABLE 9

| Surface No. | Component | Radius of Curvature | Thickness/ Distance | Refractive Index | Abbe Number | Effective Radius |
|---|---|---|---|---|---|---|
| S1 | First Lens | 19.1919 | 0.6000 | 1.777 | 49.6 | 4.891 |
| S2 | | 4.4868 | 4.9686 | | | 3.653 |
| S3 | Second Lens | −3.5939 | 1.6680 | 1.814 | 32.0 | 3.097 |
| S4 | | −7.2852 | 0.1000 | | | 3.426 |
| S5 | Third Lens | 7.0500 | 1.9718 | 1.754 | 27.7 | 3.658 |
| S6 | | −30.9595 | 0.6497 | | | 3.494 |
| S7 | Fourth Lens | −16.0765 | 1.6036 | 1.609 | 57.8 | 3.361 |

TABLE 9-continued

| Surface No. | Component | Radius of Curvature | Thickness/ Distance | Refractive Index | Abbe Number | Effective Radius |
|---|---|---|---|---|---|---|
| S8 | | −9.0919 | 0.0000 | | | 3.208 |
| S9 | Stop | Infinity | 0.3000 | | | 2.919 |
| S10 | Fifth Lens | 8.1759 | 2.4946 | 1.628 | 55.5 | 3.079 |
| S11 | Sixth Lens | −4.3502 | 0.6000 | 1.769 | 25.0 | 3.045 |
| S12 | | 11.0043 | 0.8000 | | | 3.114 |
| S13 | Seventh Lens | 14.0791 | 1.3776 | 1.603 | 58.6 | 3.379 |
| S14 | | −11.6573 | 2.7218 | | | 3.388 |
| S15 | Filter | Infinity | 0.4000 | 1.519 | 64.2 | 3.566 |
| S16 | | Infinity | 0.5500 | | | 3.582 |
| S17 | Cover Glass | Infinity | 0.4000 | 1.519 | 64.2 | 3.615 |
| S18 | | Infinity | 3.2946 | | | 3.630 |
| S19 | Imaging Plane | Infinity | 0.0000 | | | 3.827 |

TABLE 10

| Surface No. | S3 | S4 | S5 | S6 | S13 | S14 |
|---|---|---|---|---|---|---|
| k | −1.35785E+00 | −2.56521E+00 | −2.64203E−01 | −4.09982E+01 | 0.00000E+00 | 0.00000E+00 |
| A | 2.77907E−03 | 2.42620E−03 | −6.65400E−05 | −1.23359E−04 | 3.10948E−04 | 1.25100E−03 |
| B | −1.34868E−04 | −3.09190E−05 | 2.68557E−05 | 5.81456E−05 | 2.69251E−05 | 3.38497E−05 |
| C | 2.97043E−06 | −9.42852E−07 | −7.20636E−08 | −6.31487E−07 | 1.21524E−06 | 1.85444E−06 |
| D | −1.21191E−07 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 11:
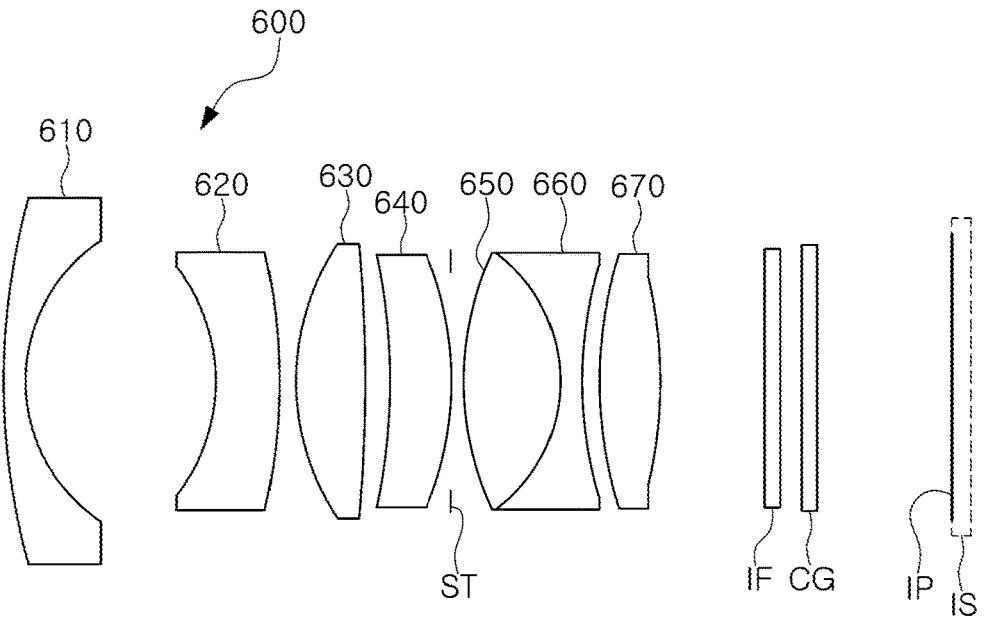
FIG. 11 is a diagram illustrating a sixth embodiment of an imaging lens system.
Figure 12:
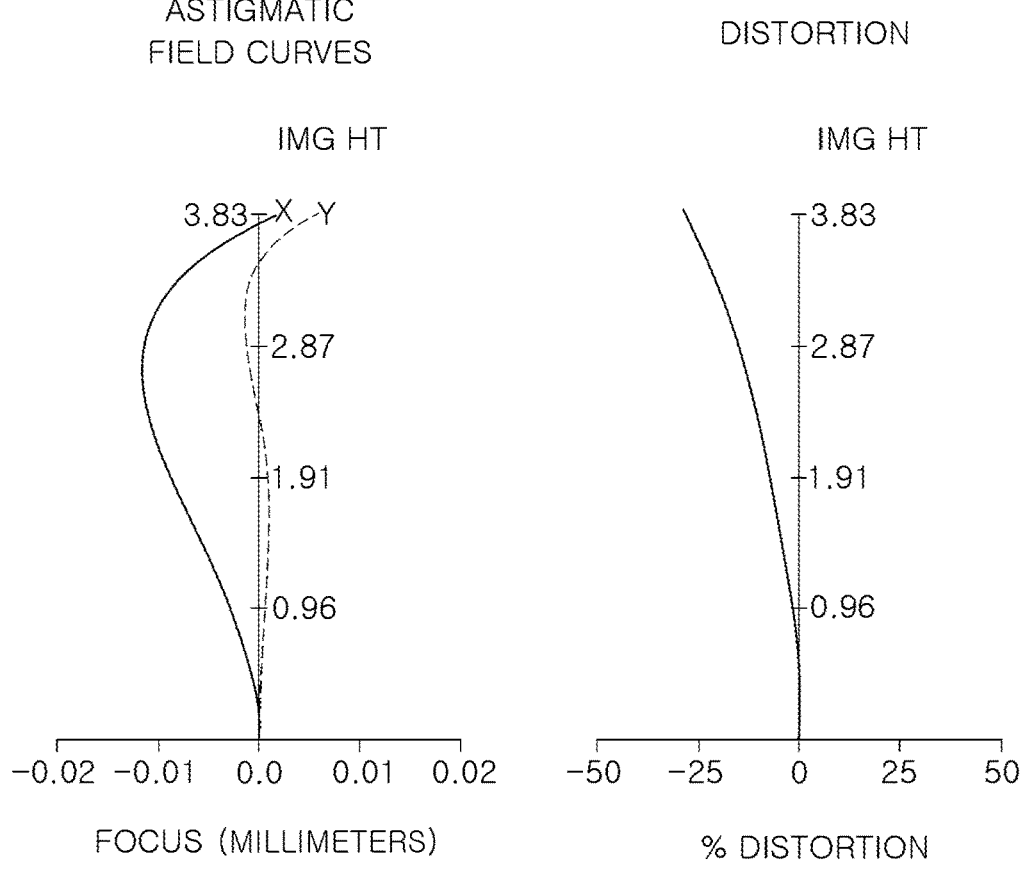
FIG. 12 is aberration curves of the imaging lens system illustrated in FIG. 11.

FIG. 11 is a diagram illustrating a sixth embodiment of an imaging lens system, and FIG. 12 is aberration curves of the imaging lens system illustrated in FIG. 11.

Referring to FIG. 11, an imaging lens system 600 may include a first lens 610, a second lens 620, a third lens 630, a fourth lens 640, a fifth lens 650, a sixth lens 660, and a seventh lens 670.

The first lens 610 may have a negative refractive power, and may have a convex object-side surface and a concave image-side surface. The second lens 620 may have a negative refractive power, and may have a concave object-side surface and a convex image-side surface. The third lens 630 may have a positive refractive power, and may have a convex object-side surface and a convex image-side surface. The fourth lens 640 may have a positive refractive power, and may have a concave object-side surface and a convex image-side surface. The fifth lens 650 may have a positive refractive power, and may have a convex object-side surface and a convex image-side surface. The sixth lens 660 may have a negative refractive power, and may have a concave object-side surface and a concave image-side surface. The seventh lens 670 may have a positive refractive power, and may have a convex object-side surface and a convex image-side surface. An inflection point may be formed on the image-side surface of the seventh lens 670. The fifth lens 650 and the sixth lens 660 may be bonded to each other. In greater detail, a radius of curvature of the image-side surface of the fifth lens 650 and a radius of curvature of the object-side surface of the sixth lens 660 may be configured to be substantially the same, and the image-side surface of the fifth lens 650 may be in contact with the object-side surface of the sixth lens 660 in a center of the optical axis.

The imaging lens system 600 may further include a stop ST, a filter IF, a cover glass CG, and an imaging plane IP. The stop ST may be disposed between the fourth lens 640 and the fifth lens 650, and the filter IF and the cover glass CG may be disposed between the seventh lens 670 and the imaging plane IP. The imaging plane IP may be formed at a position at which light incident through the first lens 610 to the seventh lens 670 is focused. For example, the imaging plane IP may be formed on one surface of an image sensor IS of a camera module or within the image sensor IS.

Tables 11 and 12 below list the lens properties and aspherical values of the sixth embodiment of the imaging lens system.

TABLE 11

| Surface No. | Component | Radius of Curvature | Thickness/ Distance | Refractive Index | Abbe Number | Effective Radius |
|---|---|---|---|---|---|---|
| S1 | First Lens | 16.6536 | 0.6000 | 1.777 | 49.6 | 4.896 |
| S2 | | 4.3915 | 4.9034 | | | 3.639 |
| S3 | Second Lens | −3.6380 | 1.6479 | 1.817 | 28.6 | 3.081 |
| S4 | | −7.4329 | 0.4000 | | | 3.378 |
| S5 | Third Lens | 7.0805 | 1.7442 | 1.750 | 26.1 | 3.637 |
| S6 | | −30.0069 | 0.6382 | | | 3.517 |
| S7 | Fourth Lens | −16.7446 | 1.6023 | 1.559 | 65.6 | 3.378 |
| S8 | | −9.2538 | 0.0000 | | | 3.198 |

TABLE 11-continued

| Surface No. | Component | Radius of Curvature | Thickness/ Distance | Refractive Index | Abbe Number | Effective Radius |
|---|---|---|---|---|---|---|
| S9 | Stop | Infinity | 0.3000 | | | 2.919 |
| S10 | Fifth Lens | 8.8333 | 2.5215 | 1.632 | 55.2 | 3.057 |
| S11 | Sixth Lens | −4.1692 | 0.6000 | 1.770 | 25.0 | 3.026 |
| S12 | | 10.6835 | 0.4000 | | | 3.120 |
| S13 | Seventh Lens | 13.8285 | 1.5710 | 1.622 | 56.3 | 3.260 |
| S14 | | −10.8697 | 2.7218 | | | 3.289 |
| S15 | Filter | Infinity | 0.4000 | 1.519 | 64.2 | 3.501 |
| S16 | | Infinity | 0.5500 | | | 3.520 |
| S17 | Cover Glass | Infinity | 0.4000 | 1.519 | 64.2 | 3.559 |
| S18 | | Infinity | 3.4997 | | | 3.577 |
| S19 | Imaging Plane | Infinity | 0.0000 | | | 3.827 |

TABLE 12

| Surface No. | S3 | S4 | S5 | S6 | S13 | S14 |
|---|---|---|---|---|---|---|
| k | −1.37430E+00 | −2.73477E+00 | −2.34952E−01 | −4.88088E+01 | 0.00000E+00 | 0.00000E+00 |
| A | 2.80317E−03 | 2.45675E−03 | −5.35972E−05 | −1.24562E−04 | 3.38486E−04 | 1.27979E−03 |
| B | −1.36388E−04 | −3.08647E−05 | 2.75344E−05 | 5.58890E−05 | 3.13715E−05 | 3.51918E−05 |
| C | 3.24503E−06 | −7.22831E−07 | −1.18602E−08 | −6.94896E−07 | 1.04575E−06 | 2.25264E−06 |
| D | −1.22944E−07 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 13:
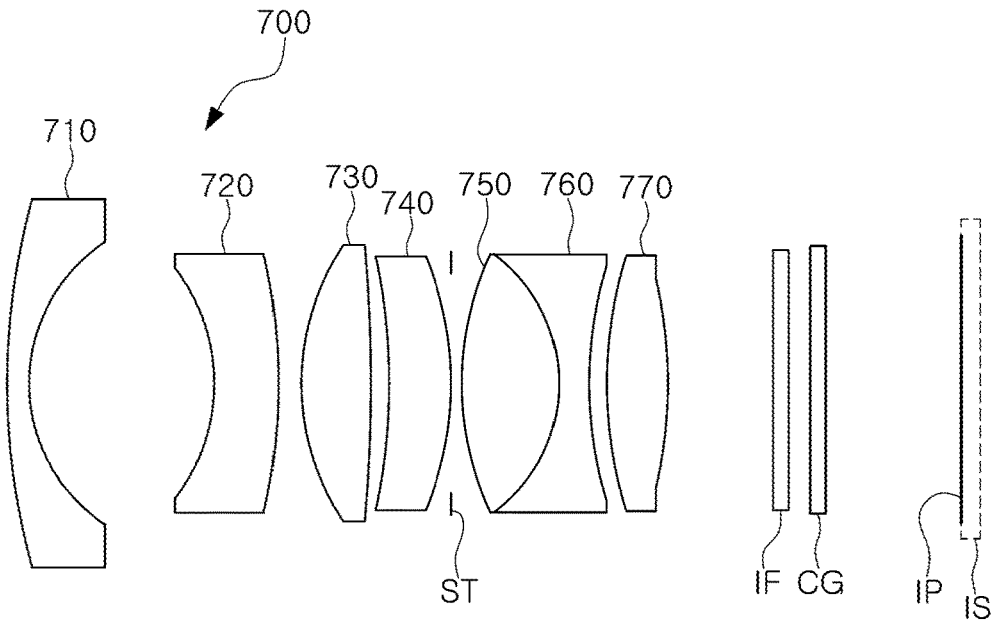
FIG. 13 is a diagram illustrating a seventh embodiment of an imaging lens system.
Figure 14:
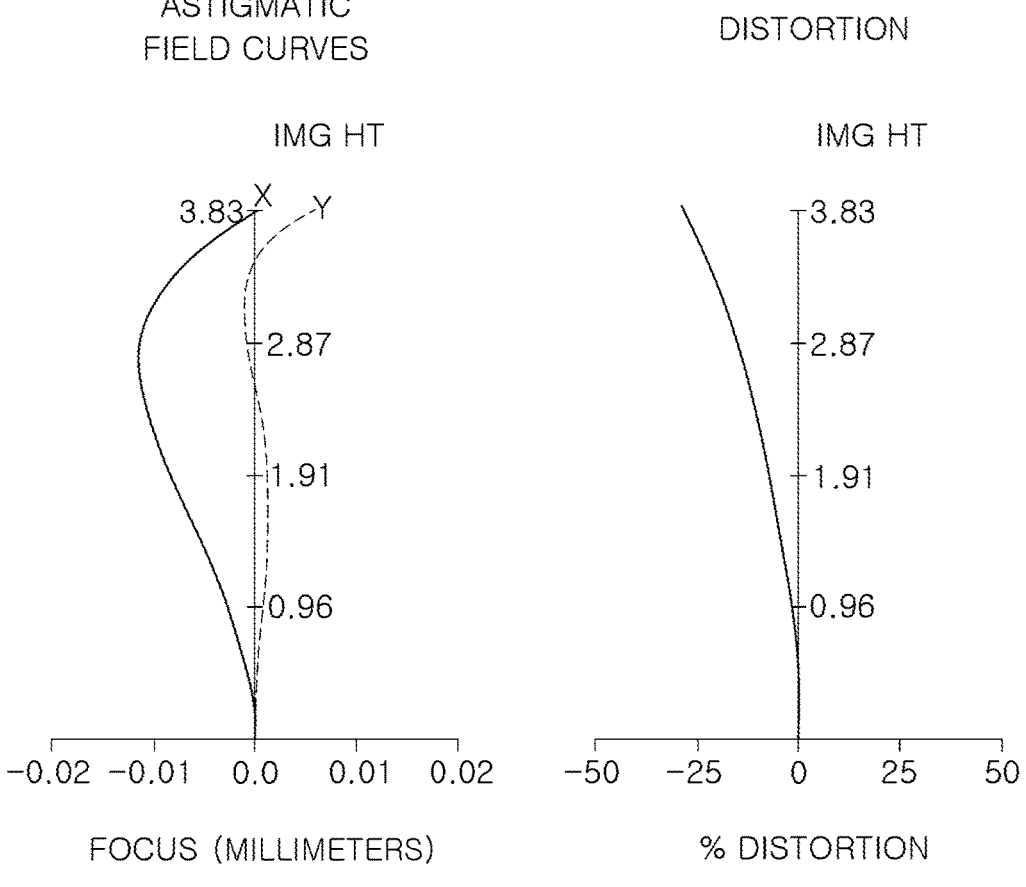
FIG. 14 is aberration curves of the imaging lens system illustrated in FIG. 13.

FIG. 13 is a diagram illustrating a seventh embodiment of an imaging lens system, and FIG. 14 is aberration curves of the imaging lens system illustrated in FIG. 13.

Referring to FIG. 13, an imaging lens system 700 may include a first lens 710, a second lens 720, a third lens 730, a fourth lens 740, a fifth lens 750, a sixth lens 760, and a seventh lens 770.

The first lens 710 may have a negative refractive power, and may have a convex object-side surface and a concave image-side surface. The second lens 720 may have a negative refractive power, and may have a concave object-side surface and a convex image-side surface. The third lens 730 may have a positive refractive power, and may have a convex object-side surface and a convex image-side surface. The fourth lens 740 may have a positive refractive power, and may have a concave object-side surface and a convex image-side surface. The fifth lens 750 may have a positive refractive power, and may have a convex object-side surface and a convex image-side surface. The sixth lens 760 may have a negative refractive power, and may have a concave object-side surface and a concave image-side surface. The seventh lens 770 may have a positive refractive power, and may have a convex object-side surface and a convex image-side surface. An inflection point may be formed on the image-side surface of the seventh lens 770. The fifth lens 750 and the sixth lens 760 may be bonded to each other. In greater detail, a radius of curvature of the image-side surface of the fifth lens 750 and a radius of curvature of the object-side surface of the sixth lens 760 may be configured to be substantially the same, and the image-side surface of the fifth lens 750 may be in contact with the object-side surface of the sixth lens 760 in a center of the optical axis.

The imaging lens system 700 may further include a stop ST, a filter IF, a cover glass CG, and an imaging plane IP. The stop ST may be disposed between the fourth lens 740 and the fifth lens 750, and the filter IF and the cover glass CG may be disposed between the seventh lens 770 and the imaging plane IP. The imaging plane IP may be formed at a position at which light incident through the first lens 710 to the seventh lens 770 is focused. For example, the imaging plane IP may be formed on one surface of an image sensor IS of a camera module or within the image sensor IS.

Tables 13 and 14 below list the lens properties and aspherical values of the seventh embodiment of the imaging lens system.

TABLE 13

| Surface No. | Component | Radius of Curvature | Thickness/ Distance | Refractive Index | Abbe Number | Effective Radius |
|---|---|---|---|---|---|---|
| S1 | First Lens | 16.1626 | 0.6000 | 1.777 | 49.6 | 4.895 |
| S2 | | 4.3633 | 4.7502 | | | 3.633 |
| S3 | Second Lens | −3.6903 | 1.5571 | 1.798 | 31.9 | 3.120 |
| S4 | | −7.5730 | 0.6000 | | | 3.386 |
| S5 | Third Lens | 7.1387 | 1.7514 | 1.753 | 26.8 | 3.673 |
| S6 | | −29.5482 | 0.4968 | | | 3.553 |
| S7 | Fourth Lens | −17.0790 | 1.6585 | 1.501 | 80.6 | 3.465 |
| S8 | | −9.1529 | 0.0000 | | | 3.259 |
| S9 | Stop | Infinity | 0.3000 | | | 2.965 |
| S10 | Fifth Lens | 9.2570 | 2.6240 | 1.640 | 54.3 | 3.094 |

TABLE 13-continued

| Surface No. | Component | Radius of Curvature | Thickness/ Distance | Refractive Index | Abbe Number | Effective Radius |
|---|---|---|---|---|---|---|
| S11 | Sixth Lens | −4.1184 | 0.6000 | 1.777 | 24.8 | 3.059 |
| S12 | | 10.1395 | 0.4000 | | | 3.163 |
| S13 | Seventh Lens | 12.4033 | 1.6378 | 1.697 | 49.6 | 3.338 |
| S14 | | −12.6823 | 2.7218 | | | 3.337 |
| S15 | Filter | Infinity | 0.4000 | 1.519 | 64.2 | 3.528 |
| S16 | | Infinity | 0.5500 | | | 3.545 |
| S17 | Cover Glass | Infinity | 0.4000 | 1.519 | 64.2 | 3.581 |
| S18 | | Infinity | 3.4524 | | | 3.598 |
| S19 | Imaging Plane | Infinity | 0.0000 | | | 3.827 |

TABLE 14

| Surface No. | S3 | S4 | S5 | S6 | S13 | S14 |
|---|---|---|---|---|---|---|
| k | −1.42428E+00 | −3.19630E+00 | −2.14262E−01 | −6.84015E+01 | 0.00000E+00 | 0.00000E+00 |
| A | 2.86234E−03 | 2.51994E−03 | −4.01721E−05 | −1.43060E−04 | 4.94696E−04 | 1.32352E−03 |
| B | −1.45168E−04 | −3.49901E−05 | 2.55250E−05 | 5.27135E−05 | 3.00677E−05 | 3.62756E−05 |
| C | 3.61538E−06 | −5.74516E−07 | 4.18969E−08 | −6.10374E−07 | 9.45284E−07 | 2.22051E−06 |
| D | −1.31695E−07 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 15:
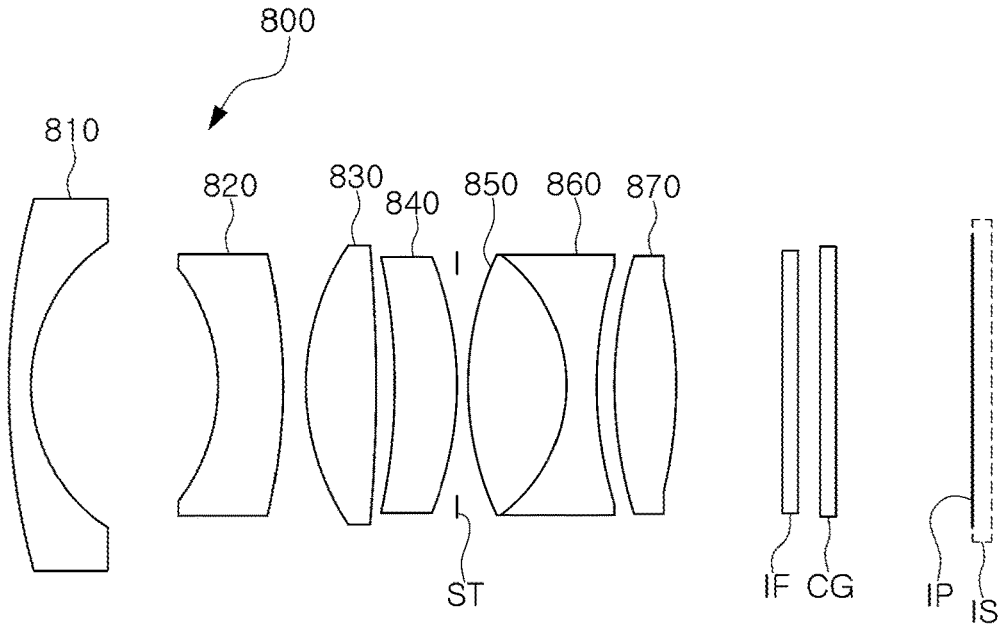
FIG. 15 is a diagram illustrating an eighth embodiment of an imaging lens system.
Figure 16:
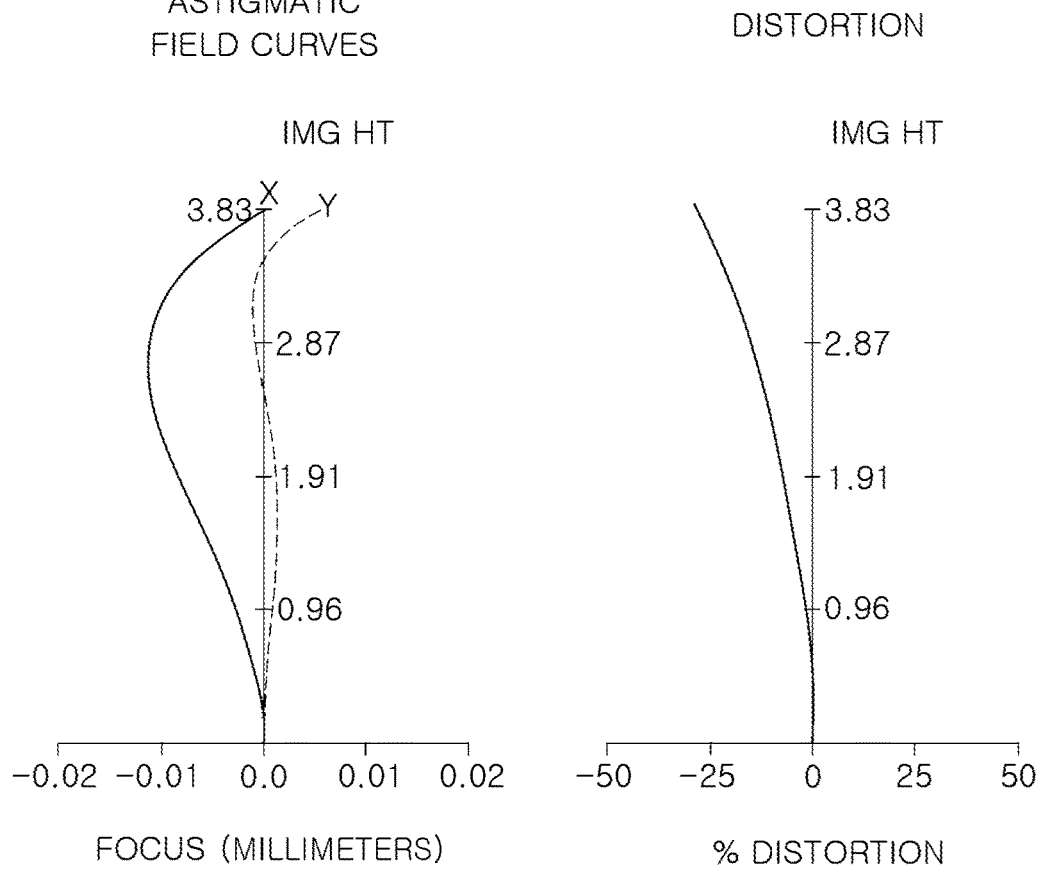
FIG. 16 is aberration curves of the imaging lens system illustrated in FIG. 15.

FIG. 15 is a diagram illustrating an eighth embodiment of an imaging lens system, and FIG. 16 is aberration curves of the imaging lens system illustrated in FIG. 15.

Referring to FIG. 15, an imaging lens system 800 may include a first lens 810, a second lens 820, a third lens 830, a fourth lens 840, a fifth lens 850, a sixth lens 860, and a seventh lens 870.

The first lens 810 may have a negative refractive power, and may have a convex object-side surface and a concave image-side surface. The second lens 820 may have a negative refractive power, and may have a concave object-side surface and a convex image-side surface. The third lens 830 may have a positive refractive power, and may have a convex object-side surface and a convex image-side surface. The fourth lens 840 may have a positive refractive power, and may have a concave object-side surface and a convex image-side surface. The fifth lens 850 may have a positive refractive power, and may have a convex object-side surface and a convex image-side surface. The sixth lens 860 may have a negative refractive power, and may have a concave object-side surface and a concave image-side surface. The seventh lens 870 may have a positive refractive power, and may have a convex object-side surface and a convex image-side surface. An inflection point may be formed on the image-side surface of the seventh lens 870. The fifth lens 850 and the sixth lens 860 may be bonded to each other. In greater detail, a radius of curvature of the image-side surface of the fifth lens 850 and a radius of curvature of the object-side surface of the sixth lens 860 may be configured to be substantially the same, and the image-side surface of the fifth lens 850 may be in contact with the object-side surface of the sixth lens 860 in a center of the optical axis.

The imaging lens system 800 may further include a stop ST, a filter IF, a cover glass CG, and an imaging plane IP. The stop ST may be disposed between the fourth lens 840 and the fifth lens 850, and the filter IF and the cover glass CG may be disposed between the seventh lens 870 and the imaging plane IP. The imaging plane IP may be formed at a position at which light incident through the first lens 810 to the seventh lens 870 is focused. For example, the imaging plane IP may be formed on one surface of an image sensor IS of a camera module or within the image sensor IS.

Tables 15 and 16 below list the lens properties and aspherical values of the eighth embodiment of the imaging lens system.

TABLE 15

| Surface No. | Component | Radius of Curvature | Thickness/ Distance | Refractive Index | Abbe Number | Effective Radius |
|---|---|---|---|---|---|---|
| S1 | First Lens | 15.0650 | 0.6000 | 1.777 | 49.6 | 4.938 |
| S2 | | 4.3982 | 4.7494 | | | 3.673 |
| S3 | Second Lens | −3.8361 | 1.5971 | 1.872 | 32.5 | 3.110 |
| S4 | | −8.2125 | 0.6000 | | | 3.359 |
| S5 | Third Lens | 7.1102 | 1.7223 | 1.772 | 26.9 | 3.664 |
| S6 | | −29.8213 | 0.4878 | | | 3.550 |
| S7 | Fourth Lens | −17.3620 | 1.7015 | 1.500 | 81.0 | 3.464 |
| S8 | | −9.2978 | 0.0000 | | | 3.249 |
| S9 | Stop | Infinity | 0.3000 | | | 2.965 |
| S10 | Fifth Lens | 9.2182 | 2.6927 | 1.647 | 53.6 | 3.097 |
| S11 | Sixth Lens | −4.0666 | 0.6000 | 1.784 | 24.5 | 3.061 |

TABLE 15-continued

| Surface No. | Component | Radius of Curvature | Thickness/ Distance | Refractive Index | Abbe Number | Effective Radius |
|---|---|---|---|---|---|---|
| S12 | | 9.9762 | 0.4000 | | | 3.171 |
| S13 | Seventh Lens | 13.1196 | 1.5210 | 1.758 | 45.9 | 3.346 |
| S14 | | −13.2757 | 2.7218 | | | 3.337 |
| S15 | Filter | Infinity | 0.4000 | 1.519 | 64.2 | 3.527 |
| S16 | | Infinity | 0.5500 | | | 3.544 |
| S17 | Cover Glass | Infinity | 0.4000 | 1.519 | 64.2 | 3.580 |
| S18 | | Infinity | 3.4565 | | | 3.598 |
| S19 | Imaging Plane | Infinity | 0.0000 | | | 3.826 |

TABLE 16

| Surface No. | S3 | S4 | S5 | S6 | S13 | S14 |
|---|---|---|---|---|---|---|
| k | −1.46074E+00 | −3.43384E+00 | −2.20716E−01 | −7.80143E+01 | 0.00000E+00 | 0.00000E+00 |
| A | 2.91563E−03 | 2.55480E−03 | −4.12789E−05 | −1.53185E−04 | 5.91838E−04 | 1.32233E−03 |
| B | −1.46012E−04 | −3.50124E−05 | 2.40618E−05 | 5.12545E−05 | 2.94577E−05 | 3.80176E−05 |
| C | 3.70225E−06 | −4.37633E−07 | 7.48676E−08 | −5.80952E−07 | 1.00705E−06 | 2.22702E−06 |
| D | −1.14625E−07 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 17:
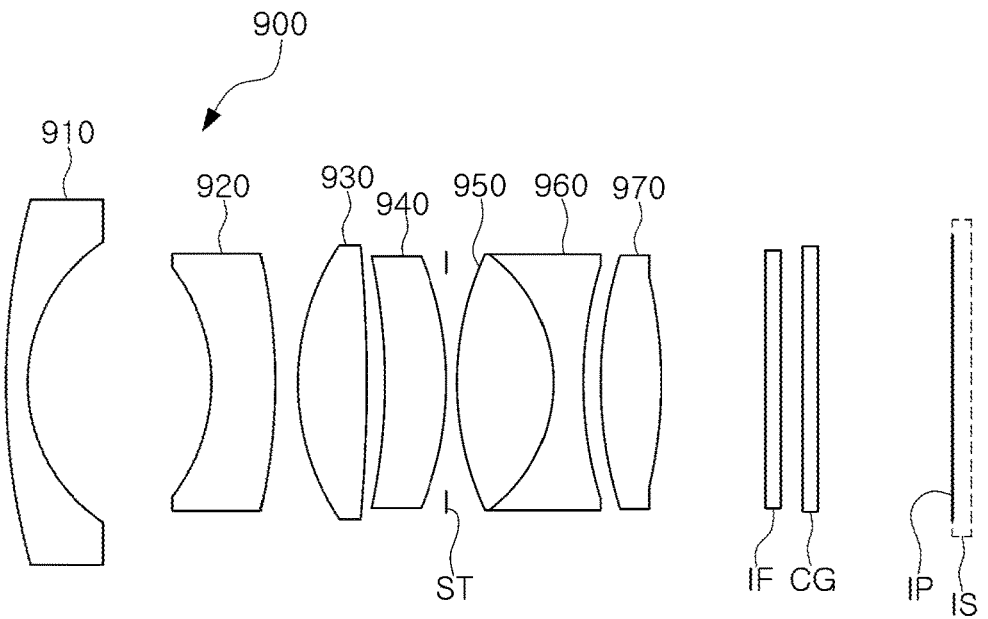
FIG. 17 is a diagram illustrating a ninth embodiment of an imaging lens system.
Figure 18:
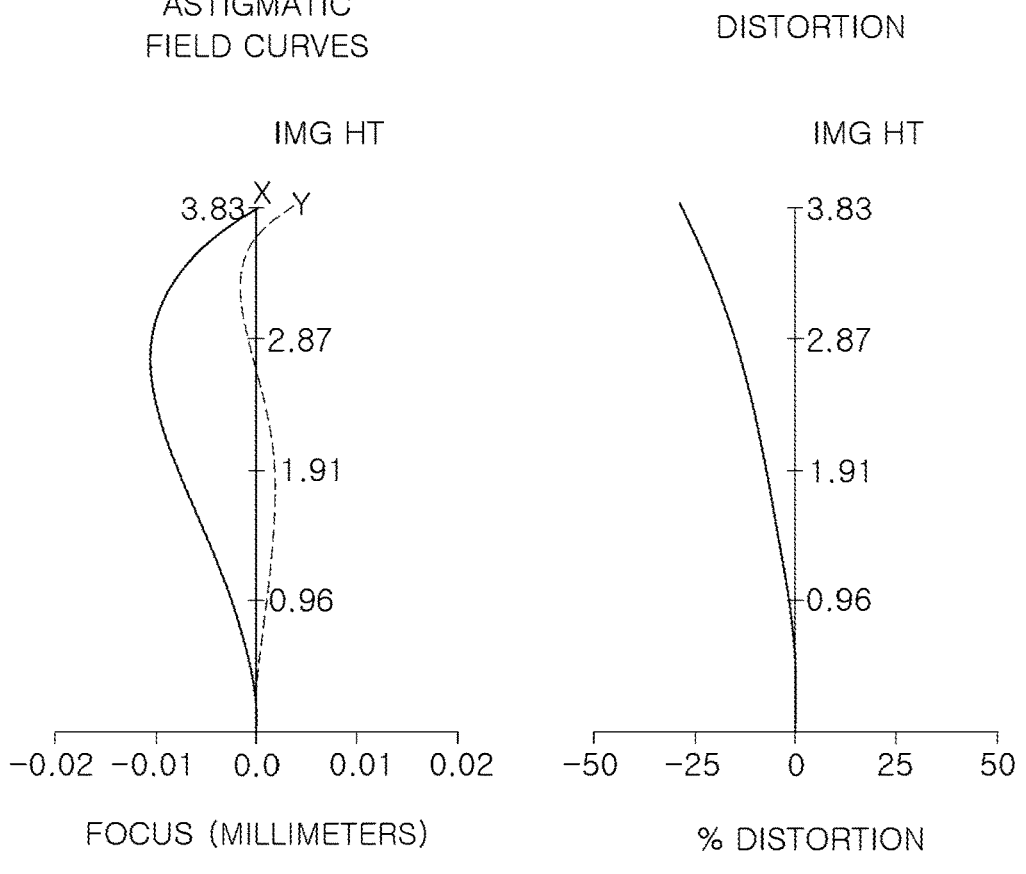
FIG. 18 is aberration curves of the imaging lens system illustrated in FIG. 17.

FIG. 17 is a diagram illustrating a ninth embodiment of an imaging lens system, and FIG. 18 is aberration curves of the imaging lens system illustrated in FIG. 17.

Referring to FIG. 17, an imaging lens system 900 may include a first lens 910, a second lens 920, a third lens 930, a fourth lens 940, a fifth lens 950, a sixth lens 960, and a seventh lens 970.

The first lens 910 may have a negative refractive power, and may have a convex object-side surface and a concave image-side surface. The second lens 920 may have a negative refractive power, and may have a concave object-side surface and a convex image-side surface. The third lens 930 may have a positive refractive power, and may have a convex object-side surface and a convex image-side surface. The fourth lens 940 may have a positive refractive power, and may have a concave object-side surface and a convex image-side surface. The fifth lens 950 may have a positive refractive power, and may have a convex object-side surface and a convex image-side surface. The sixth lens 960 may have a negative refractive power, and may have a concave object-side surface and a concave image-side surface. The seventh lens 970 may have a positive refractive power, and may have a convex object-side surface and a convex image-side surface. An inflection point may be formed on the image-side surface of the seventh lens 970. The fifth lens 950 and the sixth lens 960 may be bonded to each other. In greater detail, a radius of curvature of the image-side surface of the fifth lens 950 and a radius of curvature of the object-side surface of the sixth lens 960 may be configured to be substantially the same, and the image-side surface of the fifth lens 950 may be in contact with the object-side surface of the sixth lens 960 in a center of the optical axis.

The imaging lens system 900 may further include a stop ST, a filter IF, a cover glass CG, and an imaging plane IP. The stop ST may be disposed between the fourth lens 940 and the fifth lens 950, and the filter IF and the cover glass CG may be disposed between the seventh lens 970 and the imaging plane IP. The imaging plane IP may be formed at a position at which light incident through the first lens 910 to the seventh lens 970 is focused. For example, the imaging plane IP may be formed on one surface of an image sensor IS of a camera module or within the image sensor IS.

Tables 17 and 18 below list the lens properties and aspherical values of the ninth embodiment of the imaging lens system.

TABLE 17

| Surface No. | Component | Radius of Curvature | Thickness/ Distance | Refractive Index | Abbe Number | Effective Radius |
|---|---|---|---|---|---|---|
| S1 | First Lens | 17.3122 | 0.6000 | 1.719 | 48.1 | 4.995 |
| S2 | | 4.3799 | 4.6314 | | | 3.673 |
| S3 | Second Lens | −3.9437 | 1.5894 | 1.883 | 34.6 | 3.149 |
| S4 | | −8.6781 | 0.6000 | | | 3.398 |
| S5 | Third Lens | 7.1248 | 1.8038 | 1.779 | 26.9 | 3.739 |
| S6 | | −29.8527 | 0.4328 | | | 3.616 |
| S7 | Fourth Lens | −17.4933 | 1.7703 | 1.499 | 81.6 | 3.557 |
| S8 | | −9.2736 | 0.0000 | | | 3.341 |
| S9 | Stop | Infinity | 0.3000 | | | 2.965 |
| S10 | Fifth Lens | 9.3357 | 2.6629 | 1.654 | 53.0 | 3.150 |
| S11 | Sixth Lens | −4.0851 | 0.6000 | 1.790 | 24.3 | 3.116 |
| S12 | | 10.3206 | 0.4000 | | | 3.227 |
| S13 | Seventh Lens | 13.2137 | 1.5968 | 1.777 | 44.9 | 3.412 |

TABLE 17-continued

| Surface No. | Component | Radius of Curvature | Thickness/ Distance | Refractive Index | Abbe Number | Effective Radius |
|---|---|---|---|---|---|---|
| S14 | | −13.8555 | 2.7218 | | | 3.386 |
| S15 | Filter | Infinity | 0.4000 | 1.519 | 64.2 | 3.557 |
| S16 | | Infinity | 0.5500 | | | 3.572 |
| S17 | Cover Glass | Infinity | 0.4000 | 1.519 | 64.2 | 3.605 |
| S18 | | Infinity | 3.4409 | | | 3.620 |
| S19 | Imaging Plane | Infinity | 0.0000 | | | 3.826 |

TABLE 18

| Surface No. | S3 | S4 | S5 | S6 | S13 | S14 |
|---|---|---|---|---|---|---|
| k | −1.46450E+00 | −3.65234E+00 | −2.20978E−01 | −8.73938E+01 | 0.00000E+00 | 0.00000E+00 |
| A | 2.90752E−03 | 2.56648E−03 | −4.08368E−05 | −1.57674E−04 | 6.35293E−04 | 1.33318E−03 |
| B | −1.50550E−04 | −3.89931E−05 | 2.33950E−05 | 5.08818E−05 | 2.96639E−05 | 3.80317E−05 |
| C | 3.94211E−06 | −2.66328E−07 | 8.20802E−08 | −5.50635E−07 | 9.00507E−07 | 2.15142E−06 |
| D | −1.16696E−07 | 0 | 0 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 19:
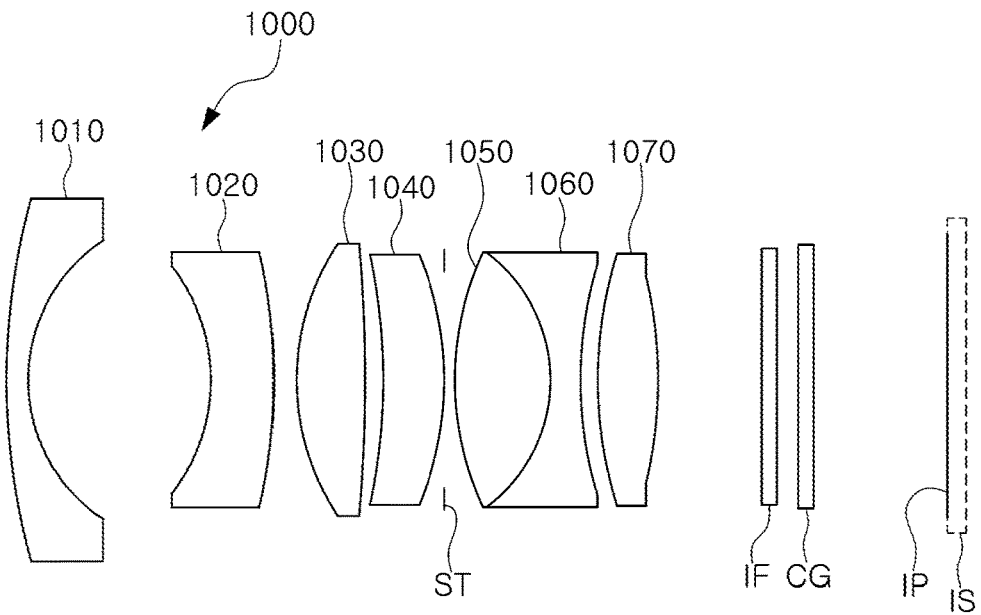
FIG. 19 is a diagram illustrating a tenth embodiment of an imaging lens system.
Figure 20:
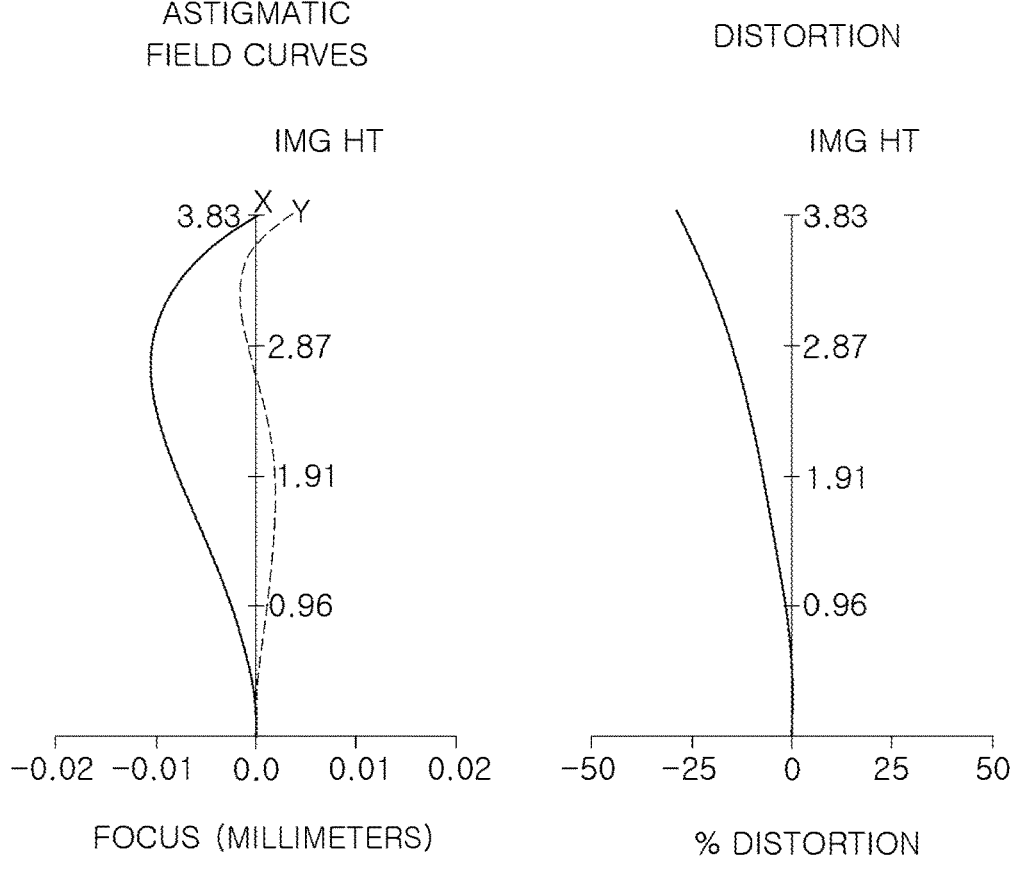
FIG. 20 is aberration curves of the imaging lens system illustrated in FIG. 19.

FIG. 19 is a diagram illustrating a tenth embodiment of an imaging lens system, and FIG. 20 is aberration curves of the imaging lens system illustrated in FIG. 19.

Referring to FIG. 19, an imaging lens system 1000 may include a first lens 1010, a second lens 1020, a third lens 1030, a fourth lens 1040, a fifth lens 1050, a sixth lens 1060, and a seventh lens 1070.

The first lens 1010 may have a negative refractive power, and may have a convex object-side surface and a concave image-side surface. The second lens 1020 may have a negative refractive power, and may have a concave object-side surface and a convex image-side surface. The third lens 1030 may have a positive refractive power, and may have a convex object-side surface and a convex image-side surface. The fourth lens 1040 may have a positive refractive power, and may have a concave object-side surface and a convex image-side surface. The fifth lens 1050 may have a positive refractive power, and may have a convex object-side surface and a convex image-side surface. The sixth lens 1060 may have a negative refractive power, and may have a concave object-side surface and a concave image-side surface. The seventh lens 1070 may have a positive refractive power, and may have a convex object-side surface and a convex image-side surface. An inflection point may be formed on the image-side surface of the seventh lens 1070. The fifth lens 1050 and the sixth lens 1060 may be bonded to each other. In greater detail, a radius of curvature of the image-side surface of the fifth lens 1050 and a radius of curvature of the object-side surface of the sixth lens 1060 may be configured to be substantially the same, and the image-side surface of the fifth lens 1050 may be in contact with the object-side surface of the sixth lens 1060 in a center of the optical axis.

The imaging lens system 1000 may further include a stop ST, a filter IF, a cover glass CG, and an imaging plane IP. The stop ST may be disposed between the fourth lens 1040 and the fifth lens 1050, and the filter IF and the cover glass CG may be disposed between the seventh lens 1070 and the imaging plane IP. The imaging plane IP may be formed at a position at which light incident through the first lens 1010 to the seventh lens 1070 is focused. For example, the imaging plane IP may be formed on one surface of an image sensor IS of a camera module or within the image sensor IS.

Tables 19 and 20 below list the lens properties and aspherical values of the tenth embodiment of the imaging lens system.

TABLE 19

| Surface No. | Component | Radius of Curvature | Thickness/ Distance | Refractive Index | Abbe Number | Effective Radius |
|---|---|---|---|---|---|---|
| S1 | First Lens | 24.7568 | 0.6000 | 1.501 | 80.8 | 5.427 |
| S2 | | 4.1322 | 4.5937 | | | 3.708 |
| S3 | Second Lens | −4.6651 | 1.9139 | 1.907 | 25.8 | 3.174 |
| S4 | | −13.2240 | 0.6103 | | | 3.337 |
| S5 | Third Lens | 7.0710 | 1.7364 | 1.774 | 24.8 | 3.590 |
| S6 | | −32.4107 | 0.2951 | | | 3.465 |
| S7 | Fourth Lens | −15.9122 | 1.6996 | 1.499 | 81.6 | 3.459 |
| S8 | | −9.0263 | 0.0000 | | | 3.255 |
| S9 | Stop | Infinity | 0.3000 | | | 2.965 |
| S10 | Fifth Lens | 9.4940 | 2.7559 | 1.661 | 52.4 | 3.120 |
| S11 | Sixth Lens | −4.0538 | 0.6000 | 1.786 | 24.4 | 3.095 |
| S12 | | 9.8804 | 0.4411 | | | 3.233 |
| S13 | Seventh Lens | 12.2028 | 1.7283 | 1.889 | 40.8 | 3.475 |
| S14 | | −16.8499 | 2.7218 | | | 3.414 |

TABLE 19-continued

| Surface No. | Component | Radius of Curvature | Thickness/ Distance | Refractive Index | Abbe Number | Effective Radius |
|---|---|---|---|---|---|---|
| S15 | Filter | Infinity | 0.4000 | 1.519 | 64.2 | 3.577 |
| S16 | | Infinity | 0.5500 | | | 3.593 |
| S17 | Cover Glass | Infinity | 0.4000 | 1.519 | 64.2 | 3.625 |
| S18 | | Infinity | 3.1540 | | | 3.640 |
| S19 | Imaging Plane | Infinity | 0.0000 | | | 3.827 |

TABLE 20

| Surface No. | S3 | S4 | S5 | S6 | S13 | S14 |
|---|---|---|---|---|---|---|
| k | −1.40701E+00 | −4.13654E+00 | −2.42329E−01 | −9.42803E+01 | 0.00000E+00 | 0.00000E+00 |
| A | 2.84216E−03 | 2.56955E−03 | −5.12652E−05 | −1.92022E−04 | 6.42895E−04 | 1.28000E−03 |
| B | −1.54505E−04 | −4.87954E−05 | 2.23483E−05 | 4.93296E−05 | 3.26155E−05 | 3.96969E−05 |
| C | 4.27883E−06 | −1.36039E−07 | 2.01660E−07 | −3.63703E−07 | 5.03002E−07 | 2.07459E−06 |
| D | −1.18726E−07 | 0 | 0.00000E+00 | 0 | 0 | 0 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Tables 21 and 22 below list optical properties values and conditional expression values of the first to tenth embodiments of the imaging lens system.

TABLE 21

| Optical Property | First Embodiment | Second Embodiment | Third Embodiment | Fourth Embodiment | Fifth Embodiment |
|---|---|---|---|---|---|
| f1 | −7.1256 | −7.0064 | −7.3336 | −8.2002 | −7.6772 |
| f2 | −13.8020 | −15.1107 | −12.4067 | −10.1548 | −10.9312 |
| f3 | 8.8748 | 9.2828 | 8.2538 | 8.0920 | 7.7917 |
| f4 | 39.9779 | 41.6546 | 36.3387 | 43.1035 | 31.6156 |
| f5 | 4.7860 | 5.8456 | 5.3083 | 5.1727 | 4.8947 |
| f6 | −3.2516 | −3.8834 | −3.6850 | −3.6060 | −3.9860 |
| f7 | 7.0469 | 7.0593 | 7.7607 | 7.2968 | 10.7948 |
| TTL | 24.5000 | 24.4973 | 24.4970 | 24.5000 | 24.5004 |
| BFL | 7.8769 | 7.8799 | 7.7010 | 7.6387 | 7.3664 |
| f | 4.5301 | 4.5625 | 4.5030 | 4.4610 | 4.4950 |
| f-number | 1.8718 | 1.8714 | 1.8000 | 1.8000 | 1.8000 |
| ImgH | 3.3250 | 3.6250 | 3.6250 | 3.6250 | 3.6250 |
| HFOV | 82.0000 | 82.0000 | 82.0000 | 82.0000 | 81.9900 |
| DFOV | 100.9800 | 101.5000 | 100.5900 | 100.0000 | 100.4600 |
| f56 | −20.2397 | −21.7682 | −23.3670 | −25.6419 | −81.8220 |

| Optical Property | Sixth Embodiment | Seventh Embodiment | Eighth Embodiment | Ninth Embodiment | Tenth Embodiment |
|---|---|---|---|---|---|
| f1 | −7.8477 | −7.8710 | −8.2002 | −8.3139 | −9.9994 |
| f2 | −10.8328 | −10.9777 | −9.9482 | −9.7160 | −8.8899 |
| f3 | 7.7944 | 7.7934 | 7.5941 | 7.5498 | 7.6482 |
| f4 | 34.3946 | 36.7654 | 37.3819 | 36.9288 | 38.6505 |
| f5 | 4.8484 | 4.8221 | 4.7379 | 4.7143 | 4.6783 |
| f6 | −3.8274 | −3.7022 | −3.6184 | −3.6359 | −3.5872 |
| f7 | 10.0307 | 9.2510 | 8.9224 | 8.9317 | 8.1930 |
| TTL | 24.5000 | 24.5000 | 24.5000 | 24.5000 | 24.5000 |
| BFL | 7.5714 | 7.5242 | 7.5283 | 7.5127 | 7.2258 |
| f | 4.4764 | 4.4741 | 4.4642 | 4.4856 | 4.5171 |
| f-number | 1.8122 | 1.7800 | 1.7690 | 1.7690 | 1.6944 |
| ImgH | 3.6250 | 3.6250 | 3.6250 | 3.6250 | 3.6250 |
| HFOV | 82.0000 | 82.0000 | 82.0000 | 82.0000 | 82.0000 |
| DFOV | 94.6600 | 100.2000 | 100.0700 | 100.3600 | 94.9900 |
| f56 | −47.3826 | −36.3797 | −35.7203 | −37.8010 | −36.8699 |

TABLE 22

| Conditional Expression | First Embodiment | Second Embodiment | Third Embodiment | Fourth Embodiment | Fifth Embodiment |
|---|---|---|---|---|---|
| ImgH/TTL | 0.13571 | 0.14798 | 0.14798 | 0.14796 | 0.14796 |
| TTL/f | 5.40827 | 5.36928 | 5.44015 | 5.49204 | 5.45059 |
| \|f/f3\| | 0.51045 | 0.49150 | 0.54557 | 0.55128 | 0.57690 |
| L1ER1/TTL | 0.38303 | 0.38433 | 0.39097 | 0.40589 | 0.29818 |
| f2/f3 | −1.55520 | −1.62781 | −1.50315 | −1.25491 | −1.40293 |
| f5/f6 | −1.47189 | −1.50527 | −1.44053 | −1.43445 | −1.22796 |
| L1ER1/ImgH | 2.82233 | 2.59726 | 2.64212 | 2.74327 | 2.01531 |
| \|V5-V6\| | 32.46100 | 33.68000 | 31.72500 | 32.29300 | 30.52800 |
| D34/D12 | 0.03851 | 0.12972 | 0.10539 | 0.13332 | 0.13076 |
| D34/D45 | 0.63547 | 2.09163 | 1.80316 | 2.27265 | 2.16562 |
| ImgH/f | 0.73398 | 0.79452 | 0.80502 | 0.81260 | 0.80645 |
| SumNd/7 | 1.66210 | 1.64237 | 1.68099 | 1.71420 | 1.70767 |
| SumV/SumNd | 26.72196 | 28.48703 | 26.44418 | 25.69645 | 25.61952 |
| (R6 + R7)/(R6 − R7) | 4.87355 | 4.29882 | 5.13149 | 4.65969 | 3.16039 |
| (R8 + R9)/(R8 − R9) | 0.20760 | 0.16800 | 0.06893 | 0.11547 | 0.05305 |
| L1ER1/HFOV | 0.11444 | 0.11482 | 0.11680 | 0.12127 | 0.08910 |

| Conditional Expression | Sixth Embodiment | Seventh Embodiment | Eighth Embodiment | Ninth Embodiment | Tenth Embodiment |
|---|---|---|---|---|---|
| ImgH/TTL | 0.14796 | 0.14796 | 0.14796 | 0.14796 | 0.14796 |
| TTL/f | 5.47315 | 5.47596 | 5.48811 | 5.46193 | 5.42383 |
| \|f/f3\| | 0.57431 | 0.57409 | 0.58785 | 0.59414 | 0.59061 |
| L1ER1/TTL | 0.39964 | 0.39955 | 0.40314 | 0.40778 | 0.44306 |
| f2/f3 | −1.38981 | −1.40858 | −1.31000 | −1.28692 | −1.16236 |
| f5/f6 | −1.26676 | −1.30249 | −1.30940 | −1.29658 | −1.30417 |
| L1ER1/ImgH | 2.70104 | 2.70043 | 2.72466 | 2.75601 | 2.99445 |
| \|V5-V6\| | 30.20800 | 29.55700 | 29.08700 | 28.64300 | 27.93200 |
| D34/D12 | 0.13016 | 0.10458 | 0.10272 | 0.09346 | 0.06424 |
| D34/D45 | 2.12745 | 1.65597 | 1.62615 | 1.44277 | 0.98367 |
| ImgH/f | 0.80980 | 0.81022 | 0.81202 | 0.80814 | 0.80251 |
| SumNd/7 | 1.70374 | 1.70603 | 1.72994 | 1.72874 | 1.71664 |
| SumV/SumNd | 25.68672 | 26.59334 | 25.93273 | 25.89718 | 27.51017 |
| (R6 + R7)/(R6 − R7) | 3.52513 | 3.73940 | 3.78700 | 3.83079 | 2.92893 |
| (R8 + R9)/(R8 − R9) | 0.02325 | −0.00566 | 0.00430 | −0.00333 | −0.02526 |
| L1ER1/HFOV | 0.11941 | 0.11938 | 0.12045 | 0.12184 | 0.13238 |

The embodiments described above may provide an imaging lens system that may provide a small f-number without excessively increasing sizes of lenses and a high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system, wherein the fourth lens has a concave object-side surface in a paraxial region thereof, and
the imaging lens system satisfies the following conditional expressions:

$$0.13 < \mathrm{Img}H/TTL < 0.16$$

$$5.3 < TTL/f < 5.5$$

$$2.8 < (R6+R7)/(R6-R7) < 5.8$$

where ImgH is a maximum effective image height on the imaging plane, TTL is a distance along the optical axis from an object side of the first lens to the imaging plane, f is a focal length of the imaging lens system, R6 is a radius of curvature of an image-side surface of the third lens at the optical axis, and R7 is a radius of curvature of the object-side surface of the fourth lens at the optical axis.

2. The imaging lens system of claim 1, wherein the second lens has a concave object-side surface in a paraxial region thereof.

3. The imaging lens system of claim 1, wherein the fourth lens has a convex image-side surface in a paraxial region thereof.

4. The imaging lens system of claim 1, wherein the sixth lens has a concave object-side surface in a paraxial region thereof.

5. The imaging lens system of claim 1, wherein the seventh lens has a convex image-side surface in a paraxial region thereof.

6. The imaging lens system of claim 1, wherein the second lens has a negative refractive power.

7. The imaging lens system of claim 1, wherein the fourth lens has a positive refractive power.

8. The imaging lens system of claim 1, wherein the sixth lens has a negative refractive power.

9. The imaging lens system of claim 1, wherein the imaging lens system further satisfies the following conditional expression:

$$0.49 \leq |f/f3| < 0.6$$

where f3 is a focal length of the third lens.

\* \* \* \* \*